(12) United States Patent
Roe

(10) Patent No.: US 8,936,176 B2
(45) Date of Patent: Jan. 20, 2015

(54) SYSTEMS FOR DISPENSING BEDDING MATERIALS INTO CAGES FOR LABORATORY ANIMALS

(75) Inventor: Philippe Roe, Medford, NY (US)

(73) Assignee: Audubon Machinery Corporation, North Tonawanda, NY (US)

( * ) Notice: Subject to any disclaimer, the term of this patent is extended or adjusted under 35 U.S.C. 154(b) by 1095 days.

(21) Appl. No.: 12/798,153

(22) Filed: Mar. 29, 2010

(65) Prior Publication Data

US 2010/0252566 A1    Oct. 7, 2010

Related U.S. Application Data

(60) Provisional application No. 61/211,234, filed on Mar. 27, 2009, provisional application No. 61/259,342, filed on Nov. 9, 2009, provisional application No. 61/259,410, filed on Nov. 9, 2009.

(51) Int. Cl.
   *B65H 3/08* (2006.01)

(52) U.S. Cl.
   USPC ........ 221/278; 221/150 A; 119/452; 119/458; 119/51.5; 119/52.4; 119/56.1; 222/145.7; 222/156; 222/429; 222/438; 222/447; 366/141; 366/156; 15/347; 198/406; 302/28

(58) Field of Classification Search
   CPC ........ B21J 15/32; A01C 7/044; B23P 19/003; B23P 19/002; B65H 3/08
   USPC ......... 15/347; 221/150 A, 278; 119/452, 458, 119/51.5, 52.4, 56.1; 198/406; 222/145.7, 222/156, 429, 438, 447; 83/646; 366/141, 366/156; 302/28
   See application file for complete search history.

(56) References Cited

U.S. PATENT DOCUMENTS

| 241,347 | A | | 5/1881 | Frame et al. |
| 807,484 | A | * | 12/1905 | Moss ......................... 222/145.7 |
| 1,342,456 | A | | 6/1920 | Nagel |
| 1,415,319 | A | | 5/1922 | Draver |
| 1,778,588 | A | | 10/1930 | Ebersole |
| 2,122,679 | A | | 7/1938 | Carter |
| 2,138,356 | A | * | 11/1938 | Miles et al. ....................... 141/7 |
| 3,197,013 | A | * | 7/1965 | Van Der Winden .......... 198/381 |
| 3,580,644 | A | * | 5/1971 | Ballard, Jr. ..................... 406/30 |

(Continued)

*Primary Examiner* — Rakesh Kumar

(74) *Attorney, Agent, or Firm* — Daniel P. Burke & Associates, PLLC

(57) ABSTRACT

The present invention is directed to dispensers of bedding materials for laboratory animal cages. According to one embodiment of a dispensing unit, materials are drawn into a storage chute by a vacuum and dispensing is accomplished in a dispenser comprising a plurality of dispensing chutes having dispensing openings through which material is dispensed into cages. While in a first position, a material directing gate allows the materials to be dispensed through one of the dispensing chutes into a first number of cages, and through another one of the dispensing chutes into a second number of cages while in a second position. According to another embodiment of the present invention, the vacuum from the vacuum blower is utilized to remove dust from the dispensing area where material is dispensed into cages. Another aspect of the present invention is directed to a system for aligning, indexing and drying laboratory animal cages which have already been cleaned in a cleaning station. Another aspect of the present invention relates to a programmable controller which advantageously facilitates the programming of automated control of the dispensing system.

16 Claims, 26 Drawing Sheets

(56) References Cited

U.S. PATENT DOCUMENTS

| | | | |
|---|---|---|---|
| 3,762,451 A | 10/1973 | Anderson | |
| 3,799,622 A | 3/1974 | Hek | |
| 3,870,199 A | 3/1975 | Dugger et al. | |
| 3,902,586 A | 9/1975 | Hill | |
| 3,995,668 A | 12/1976 | Goodman | |
| 4,002,005 A * | 1/1977 | Mueller et al. | 53/442 |
| 4,029,194 A | 6/1977 | Feurstein et al. | |
| 4,120,393 A | 10/1978 | Motooka et al. | |
| T993,003 I4 | 4/1980 | Kolthoff, Jr. | |
| 4,435,114 A * | 3/1984 | Fardin | 414/798.9 |
| 4,459,999 A | 7/1984 | Brackmann et al. | |
| 4,526,214 A * | 7/1985 | McGregor | 141/59 |
| 4,550,755 A * | 11/1985 | Vredenburg, Sr. | 141/59 |
| 4,695,205 A | 9/1987 | Levine | |
| 4,922,932 A * | 5/1990 | Williams et al. | 131/290 |
| 5,133,446 A | 7/1992 | Draghetti | |
| 5,165,181 A | 11/1992 | Acosta, Sr. et al. | |
| 5,181,480 A | 1/1993 | Dabolt | |
| 5,234,037 A | 8/1993 | Derby | |
| 5,275,130 A | 1/1994 | Muckler | |
| 5,284,388 A | 2/1994 | Volk et al. | |
| 5,305,912 A | 4/1994 | Johnston | |
| 5,377,425 A * | 1/1995 | Kawakami et al. | 34/92 |
| 5,385,644 A | 1/1995 | Hannus et al. | |
| 5,439,094 A | 8/1995 | Hakansson | |
| 5,564,329 A | 10/1996 | Tomimatsu | |
| 5,771,840 A * | 6/1998 | Pelletier | 119/452 |
| 5,916,110 A * | 6/1999 | Sanfilippo et al. | 53/510 |
| 5,943,786 A | 8/1999 | Stahley | |
| 6,273,153 B1 | 8/2001 | Reinsch | |
| 6,431,407 B1 * | 8/2002 | Hogan et al. | 222/278 |
| 6,553,939 B1 | 4/2003 | Austin et al. | |
| 6,776,561 B1 | 8/2004 | Yeh | |
| 6,827,529 B1 * | 12/2004 | Berge et al. | 406/28 |
| 6,889,485 B2 | 5/2005 | Davaillon | |
| 7,194,822 B2 | 3/2007 | Kolari | |
| 7,198,077 B1 * | 4/2007 | Uzkan et al. | 141/248 |
| 7,325,700 B1 * | 2/2008 | Masten et al. | 221/265 |
| 7,849,664 B2 * | 12/2010 | Corbett et al. | 53/472 |
| 8,002,104 B2 * | 8/2011 | Lim et al. | 198/406 |
| 8,201,591 B2 * | 6/2012 | Monti | 141/81 |
| 8,522,453 B2 * | 9/2013 | Robert et al. | 34/585 |
| 2004/0112095 A1 * | 6/2004 | Bolduan et al. | 68/5 C |
| 2005/0092577 A1 * | 5/2005 | Nickey et al. | 198/345.1 |
| 2006/0010714 A1 | 1/2006 | Carin et al. | |
| 2007/0119382 A1 * | 5/2007 | Austin et al. | 119/452 |
| 2008/0121498 A1 | 5/2008 | Costanzo et al. | |
| 2008/0276873 A1 * | 11/2008 | Waldner et al. | 119/51.5 |

* cited by examiner

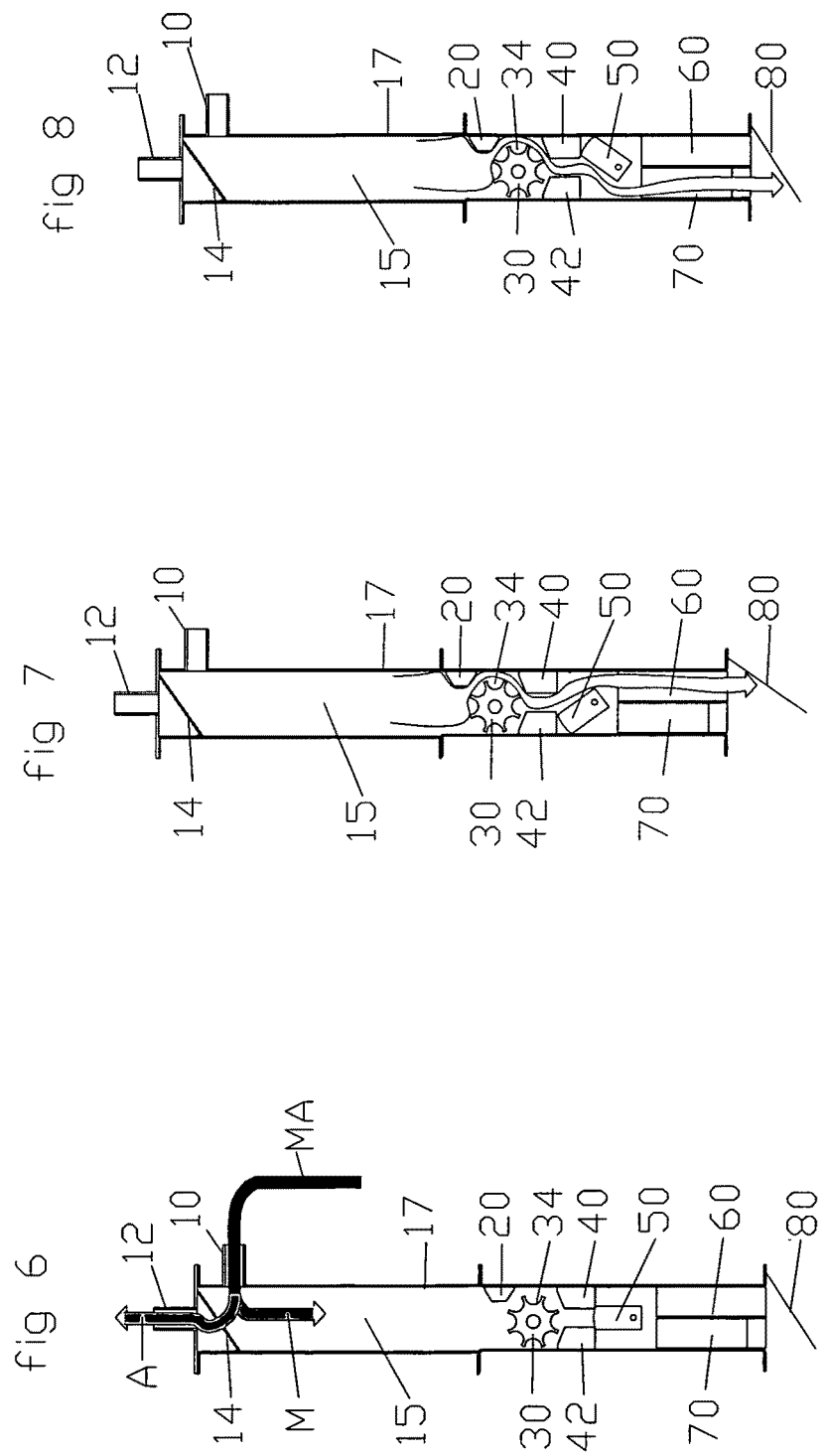

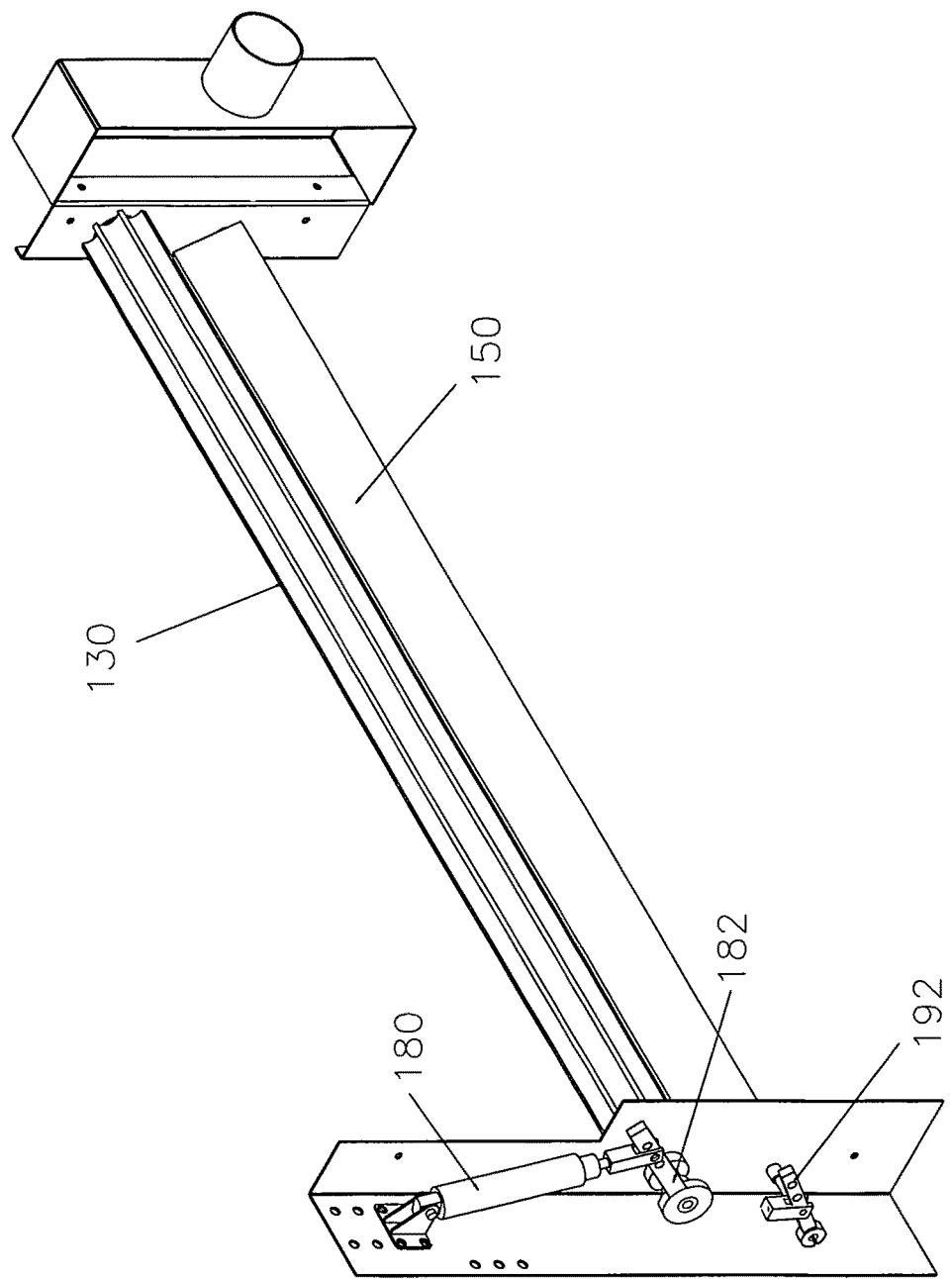

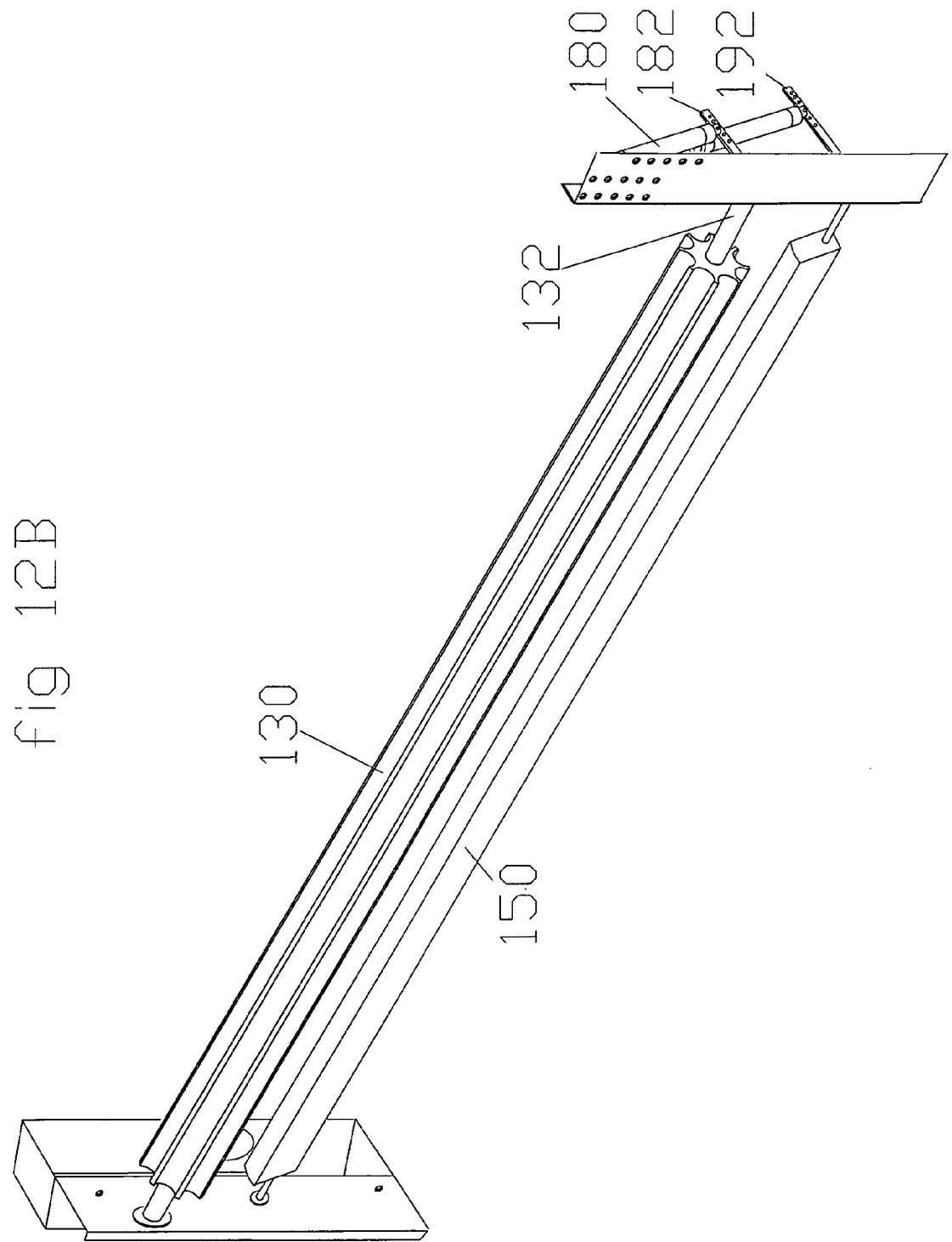

SYSTEMS FOR DISPENSING BEDDING MATERIALS INTO CAGES FOR LABORATORY ANIMALS

RELATED APPLICATION DATA

This application claims the benefit of U.S. provisional patent applications 61/211,234 filed on Mar. 27, 2009, 61/259,342 filed on Nov. 9, 2009 and 61/259,410 filed on Nov. 9, 2009.

The present invention is directed to dispensing systems for relatively small, light solid materials and, is particularly suited for dispensing bedding materials, including environmental enrichment materials, into cages for laboratory animals.

BACKGROUND OF THE INVENTION

Laboratory animals are often maintained in cages, e.g. large plastic bins. Such cages need to be cleaned and maintained on a regular basis. It is common to provide a bedding material on the bottom of such cages. Known bedding materials include corncob bedding, wood chip and wood shaving bedding materials, and paper bedding materials comprising paper sheets, paper pulp or recycled paper.

In order to accommodate a high volume of cages and to expedite the bedding of cages following cleaning, automated equipment has been used. Recently, some laboratories have been using environmental enrichment materials in animal cages. For example, small coiled paper rolls have been found to be desirable in some laboratory animal cages. The animals can "play" with the paper coils, by unrolling and/or tearing the paper, and can build nests within their cages with such materials. Such environmental enrichment materials are not suitable for dispensing with known dispensing equipment due to the materials inherent higher angle of repose and bridging coefficient.

SUMMARY OF THE INVENTION

The various aspects of the present invention are directed to dispensers and are described herein with respect to the dispensing of bedding materials for laboratory animal cages. As used herein, the term "bedding material" refers to any material used in laboratory animal cages, including but not limited to, corncob bedding, wood chip and wood shaving bedding materials, paper bedding materials comprising paper sheets, paper pulp or recycled paper, and environmental enrichment materials. The disclosed dispensers can be used for bedding or other materials. The embodiments of the present invention have been shown to successfully dispense environmental enrichment materials.

Materials dispensed into cages used for laboratory animals, e.g. large plastic bins, can be drawn from a material supply source utilizing a vacuum, for example a vacuum blower which creates a negative pressure in a vacuum receiver. Materials are then permitted to fall from the vacuum receiver into a storage chute from which they are dispensed, in a controlled manner, into the cages.

According to one embodiment of the present invention, a dispensing unit is provided with a sealable dispensing area which facilitates the bedding material(s) and air to be drawn into a storage chute with a vacuum. After the materials have been drawn into the storage chute, the vacuum is stopped and dispensing is accomplished with a rotatable impeller. As the material is initially entering the storage chute under the influence of the vacuum, the material acts substantially as a fluid. However, when the material settles into the storage chute, the material acts more as a cohesive solid subject to the disadvantages inherent in its high angle of repose and bridging/arching. In order to address the high angle of repose and bridging/arching tendency of the environmental enrichment materials, a wiper is positioned to cooperate with a rotatable impeller to refluidize the materials, i.e. eliminate any adverse effects of bridging/arching, prior to the materials passage to a material directing gate.

As used herein, the term "angle of repose" is used to indicate the maximum slope, measured in degrees from the horizontal, at which loose solid material will remain in place without sliding. As used herein, the term "bridging/arching" is used to indicate the non-flowing condition, a zero "Flow Function" (cohesive strength/pressure relationship), arising from the material's cohesive strength and as a function of applied consolidation pressure. Cohesive strength as measured by ASTM D 6128-97.

For example, where typical corncob bedding material has an angle of repose of about 7.7 degrees to 10.8 degrees, the present invention is useful with environmental enrichment materials having an angle of repose of greater than 16 degrees. When the environmental enrichment materials are induced into motion, they will exhibit some properties of a fluidized flow. Nonetheless, as they are essentially solids, they are treated differently at different stages during the dispensing.

Preferred embodiments illustrated below are also useful with different sized cages. These embodiments comprise a movable material directing gate which is selectively movable between at least three positions. In one position, the dispensing portion is closed and the material directing gate preferably provides an airtight seal at the bottom of the dispenser housing. In a second position, the material directing gate allows the materials to be dispensed through chutes designed to dispense into a first number of cages, while in a third position, the material directing gate allows the materials to be dispensed through chutes designed to dispense into a single cage or a different number of cages than the first number of cages.

The dispensing systems of the present invention overcome difficulties of accurately metering and dispensing environmental enrichment materials which have much higher angles of repose and bridging coefficients than typical bedding materials.

According to another embodiment of the present invention, the vacuum from the vacuum blower is utilized to remove dust from the dispensing area where material is dispensed into cages.

Another aspect of the present invention is directed to a system for aligning, indexing and drying of laboratory animal cages which have already been cleaned in a cleaning station. A drying device utilizes a plurality of nozzles mounted on a stationary support as the cages enter the dispenser on one embodiment or on a movable support which dries cages when the cages are at least partially inverted in another embodiment.

Another aspect of the present invention relates to a programmable controller which advantageously facilitates the programming of automated control of the dispensing system.

BRIEF DESCRIPTION OF THE DRAWINGS

FIG. 6 is a side diagrammatic view of the an embodiment of the present invention during a loading phase.

FIG. 7 is a diagrammatic view of the embodiment of FIG. 6 illustrating a first dispense mode.

FIG. 8 is a diagrammatic view of the embodiment of FIG. 6 illustrating a second dispense mode.

FIG. 12A is a partial, right perspective view of components shown in FIG. 11.

FIG. 12B is a partial, left perspective view of components shown in FIG. 11.

FIG. 19A is a partial perspective view of another embodiment of an alignment and indexing device of the present invention.

DETAILED DESCRIPTION

Figure 1:
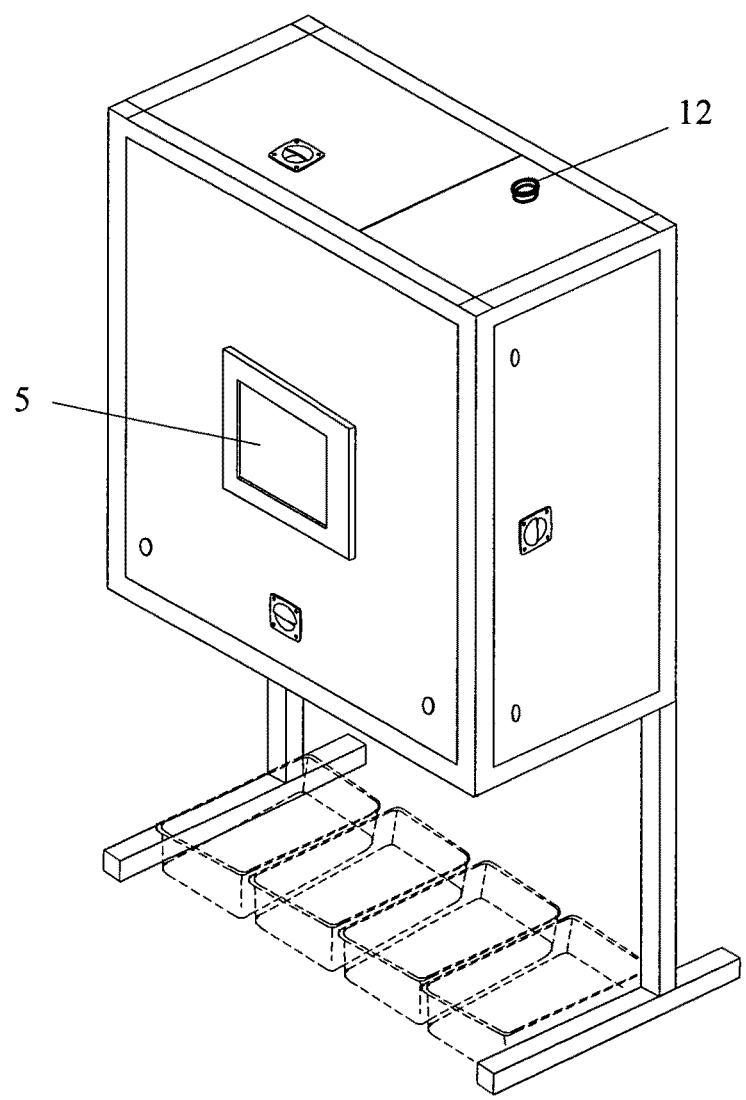
FIG. 1 is a front perspective view of a first embodiment of the present invention illustrating four animal cages in phantom.
Figure 2:
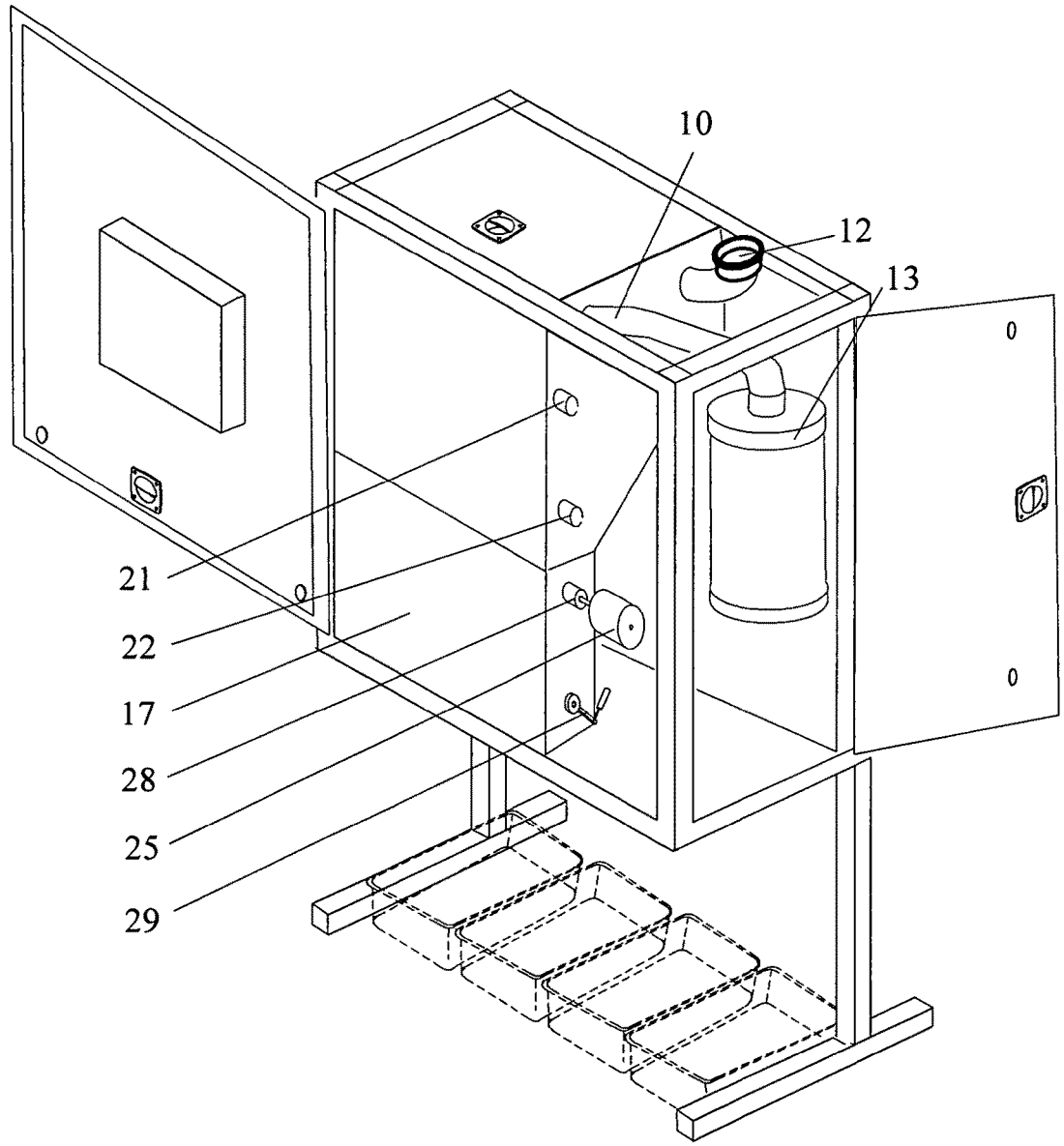
FIG. 2 is a front perspective view of the embodiment of FIG. 1 with a front door in an open position.
Figure 3:
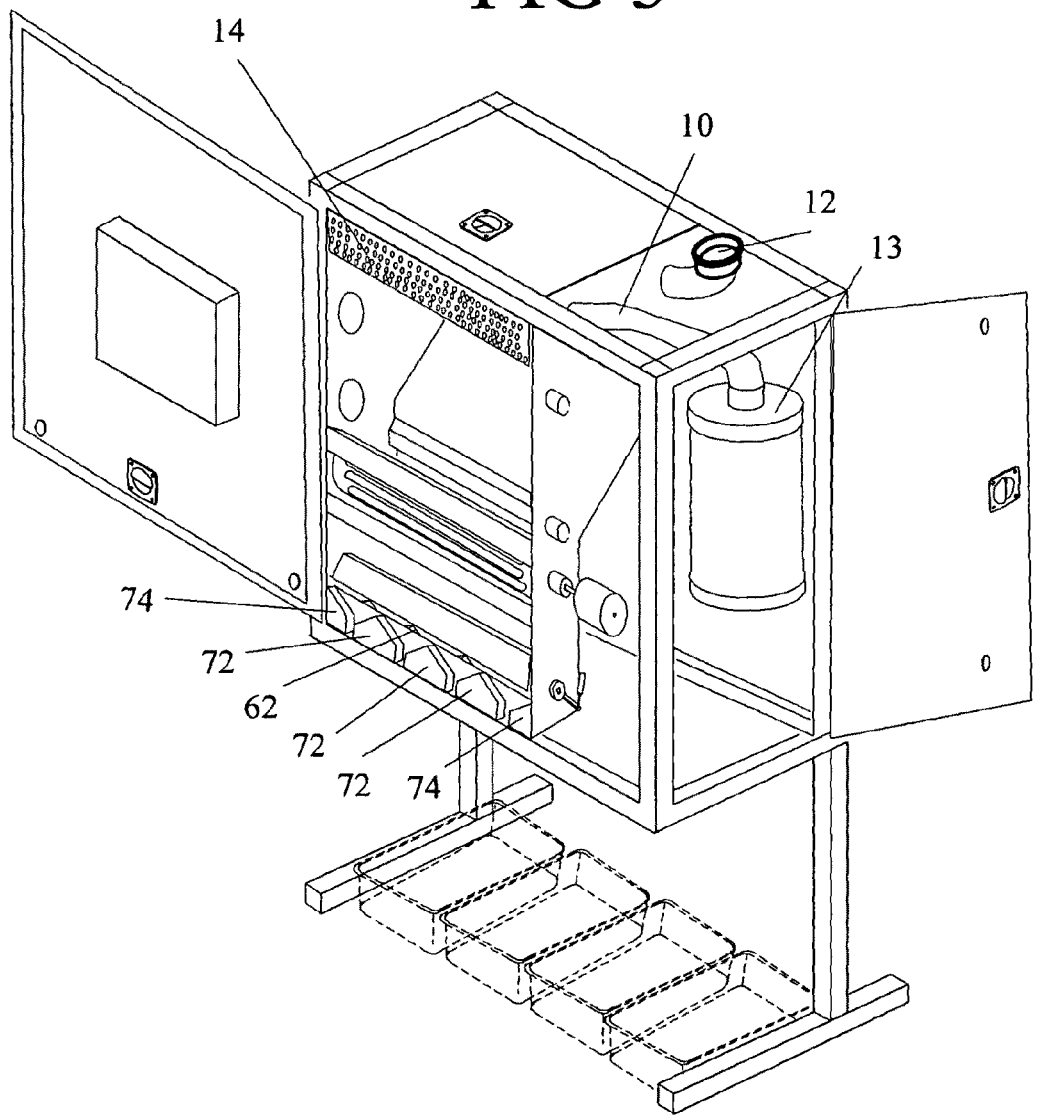
FIG. 3 is a partial, front perspective view of FIG. 1 with the front door in the open position illustrating internal components.
Figure 4:
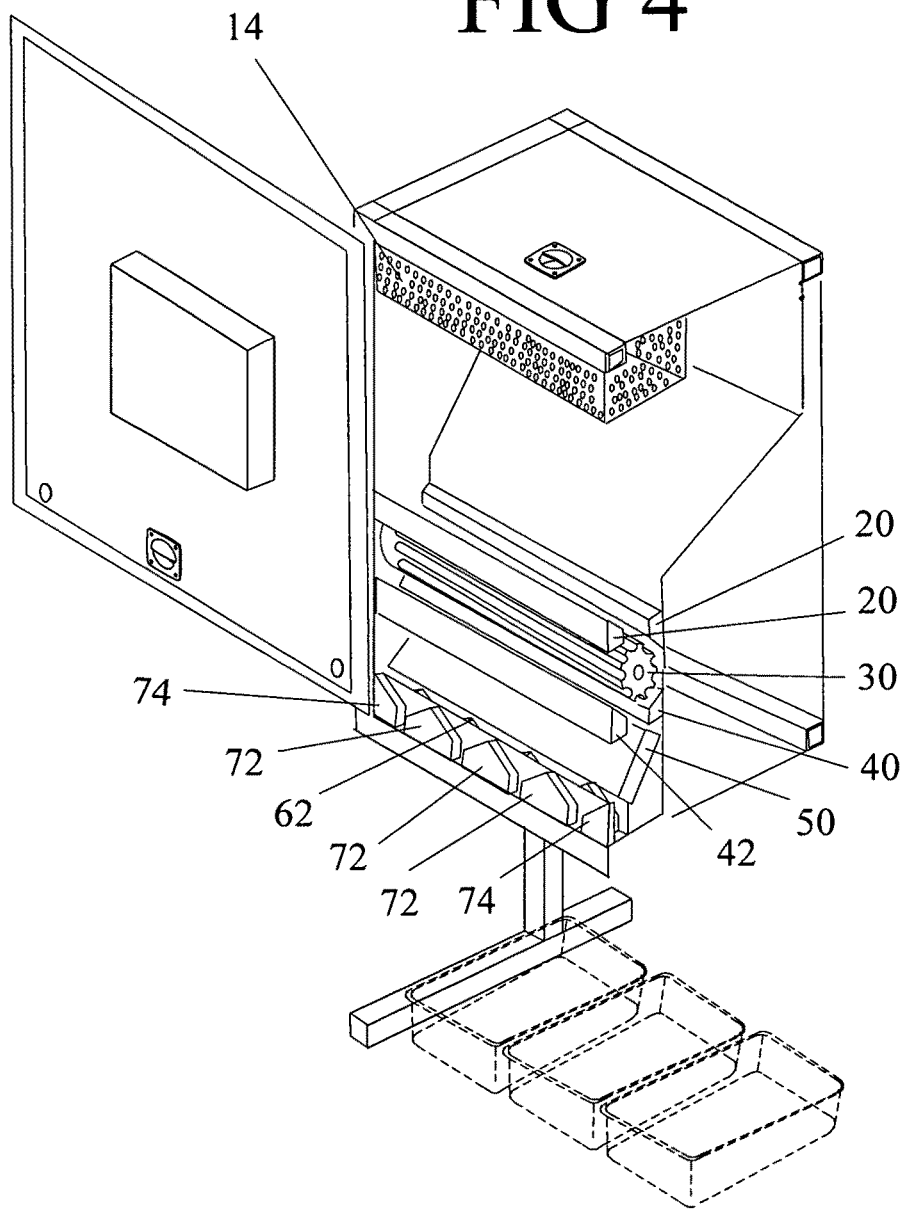
FIG. 4 is a partial, front perspective view of the embodiment of FIG. 1 with portions removed.
Figure 5:
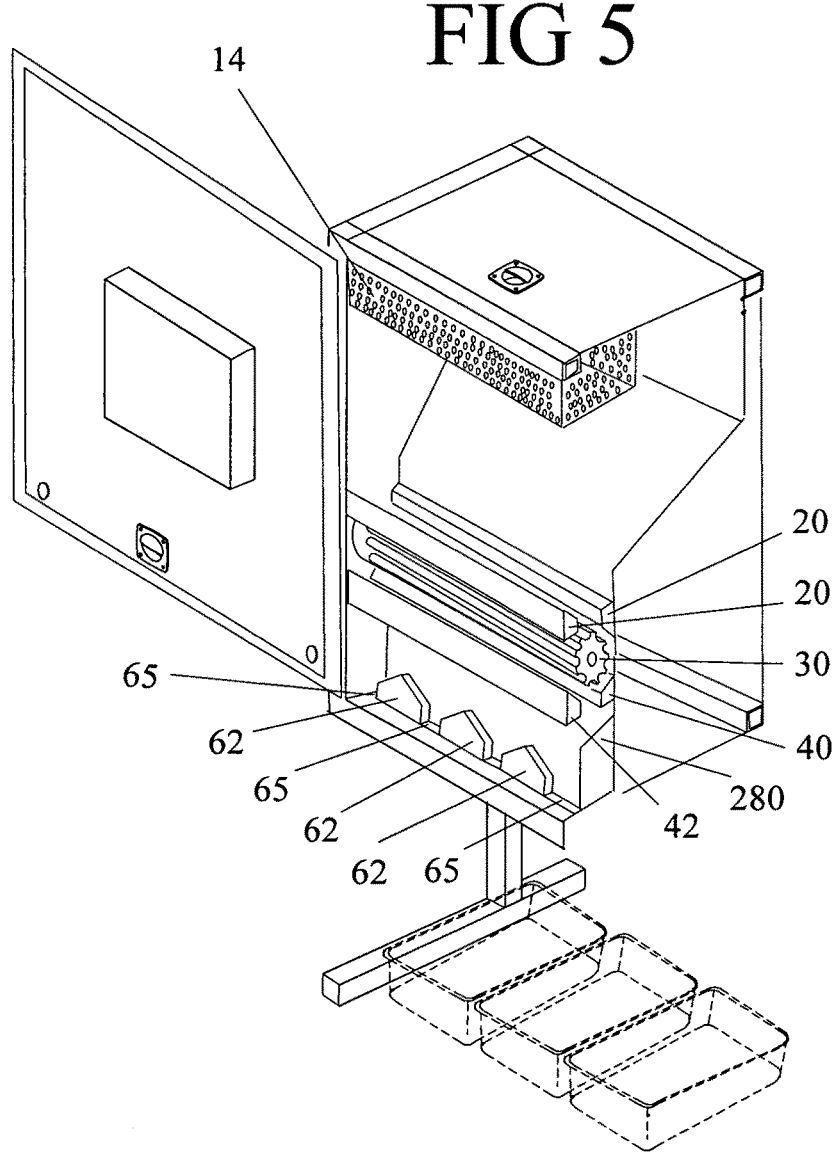
FIG. 5 is a partial, front perspective view of FIG. 1 with portions removed.

FIGS. 1-5 illustrate various views of one embodiment of a bench top dispensing system of the present invention. This dispensing system is a free standing system that can be set up on a surface such, as on portable cart, or used in conjunction with a conveyor type bedding dispenser. FIG. 1 illustrates the dispensing unit with four cages shown in phantom. The front door of the dispensing unit is closed and has a touch screen control panel 5. FIG. 2 illustrates the dispensing unit with the front door and a side door in an open position and the cages shown in phantom. FIG. 3 is a partial view of the dispensing unit with a front housing wall 17 removed, thereby showing the components which move the materials. FIGS. 4 and 5 are partial perspective views with portions removed. FIG. 4 illustrates a first set of gable diverters. FIG. 5 shows a second set of gable diverters. In this embodiment, the second set of gable diverters are positioned behind the first set of gable diverters.

FIGS. 6-8 are diagrammatic, cross-sectional side views of one preferred dispensing system of the present invention. As shown diagrammatically by the arrows in FIG. 6, a fluidized flow of air and materials MA to be dispensed, e.g. environmental enhancement materials, is drawn into the top of a storage chute 15 by a vacuum pressure applied to an outlet conduit 12. While the arrows are wide and continuous, the material is in the form of small solids. A perforated filter screen 14 prevents the bedding, e.g. environmental enrichment, materials M from exiting through outlet conduit 12 but allows airstream A to be drawn out by the vacuum source 13 (shown in FIG. 2). During this initial loading stage, the bottom of the dispenser is sealed, preferably in an airtight manner, to avoid leakage of air into the interior of the storage chute 15 which would tend to decrease the efficiency of the transport of the air and materials AM into the storage chute 15. During this initial loading phase, material M will tend to fall downwardly in the storage chute 15, however, due to its relatively low density and the force of the vacuum, some of the materials M may remain in the upper region of the storage chute 15. After a desired quantity of material has been drawn into the storage chute 15, the application of the vacuum to outlet conduit 12 is preferably stopped thereby allowing all remaining materials M to fall in storage chute 15.

According to this illustrated embodiment of the present invention, and with reference to FIGS. 3-9, a wiper 20, a rotatable impeller 30, a right lower rail 40, a left lower rail 42, a movable material directing gate 50, a right dispensing chute 60 and a left dispensing chute 70 are positioned in the dispenser near the lower portion of the storage chute 15.

In the configuration shown in FIG. 6, material directing gate 50 is in a central or closed position which prevents material from flowing downwardly into either dispensing chute 60, 70. Material directing gate 50 also advantageously provides a substantially airtight seal with the bottom portions of the lower rails 40, 42. When the material directing gate 50 is in this position as illustrated in FIG. 6, the lower portion of the illustrated dispensing unit is preferably airtight to facilitate the initial loading of material into storage chute 15. When it is desired to dispense materials into cages positioned below either of dispensing chute 60 or dispensing chute 70, material directing gate 50 is selectively moved to a first dispensing position shown in FIG. 7 or a second dispensing position shown in FIG. 8.

Figure 9:
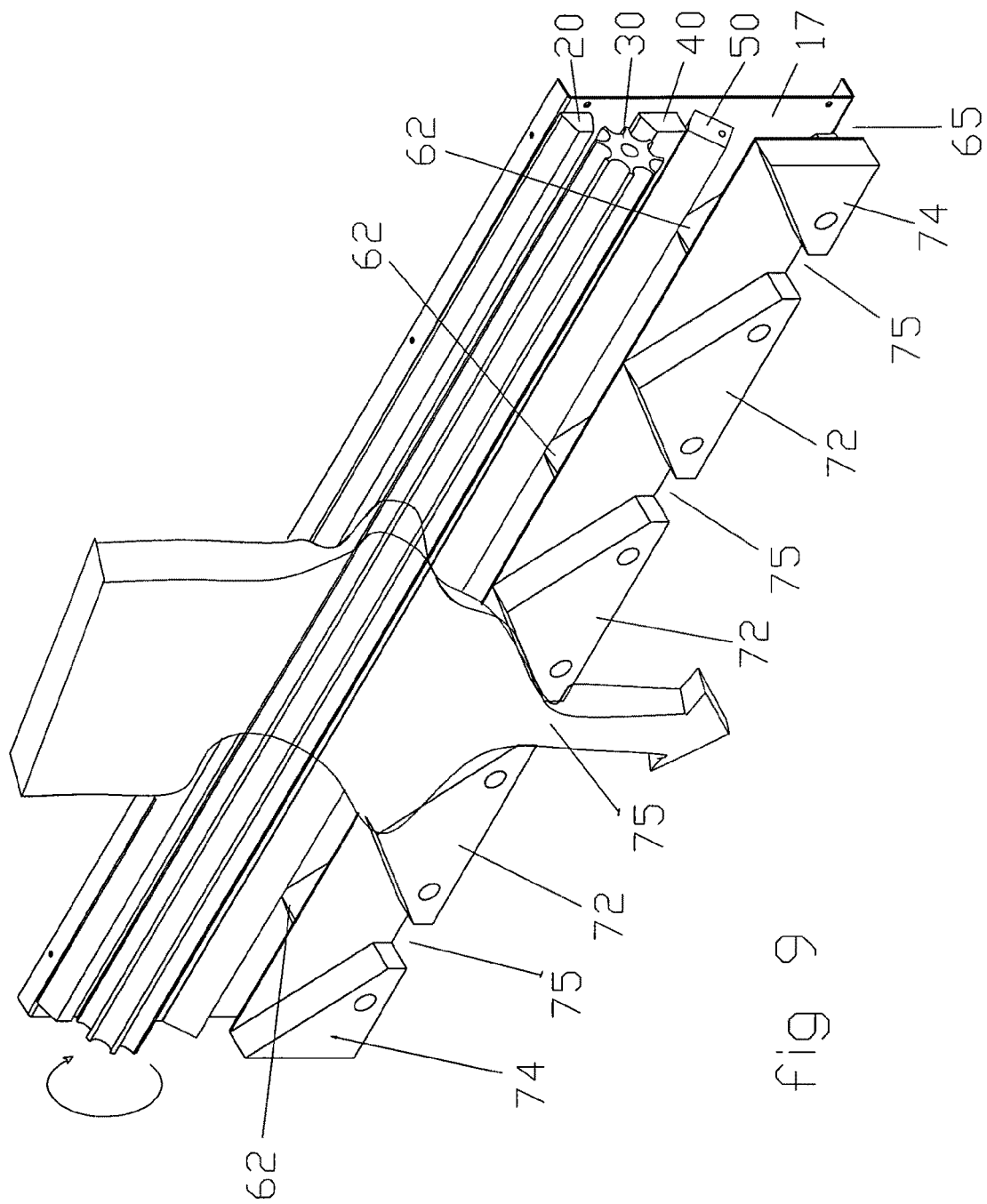
FIG. 9 is a partial, left perspective view of the dispenser of FIG. 6 illustrating the direction of material flow in the second dispense mode.

With reference to FIG. 9, left dispensing chute 70 comprises three spaced gable diverters 72 and two, half gable diverters 74 which collectively define four dispensing openings 75 through which material may pass. (From the present drawings, it will be understood the housing wall on the left side of the dispenser is not shown in FIG. 9). The dispensing chute 70 is therefore designed to simultaneously dispense material into four cages positioned below dispensing chute 70 through dispensing openings 75. From the present description and drawings, it will be appreciated that by using a different number of gables/half gables, it is possible to provide a different number of openings through which materials may be dispensed. This is particularly useful in facilities which use cages of different sizes. For example, a facility may use large cages which are dimensioned such that four cages simultaneously pass below the illustrated dispensing unit. The laboratory facility may also utilize smaller cages having smaller dimensions which permit five cages to pass simultaneously below the dispensing unit. In this instance, material can be dispensed through dispensing chute 60 which has five dispensing openings 65 defined by the spaces between four gables 62 and the ends of the dispensing unit. Thus, in dispensing chute 60, four full gables 62 (only three of which are shown in FIG. 9) and the two end walls define five dispensing openings 65 which allow the simultaneous and even dispensing of material into five smaller cages positioned below dispensing chute 60. Different numbers of gable diverters will accommodate different numbers of cages in the same manner. Dispensing chute 60 is preferably provided with a different number of dispensing openings than dispensing chute 70. For example, gable diverters are positioned in a dispensing chute to define at a minimum, one dispensing opening, up to about six dispensing openings.

Figure 10:
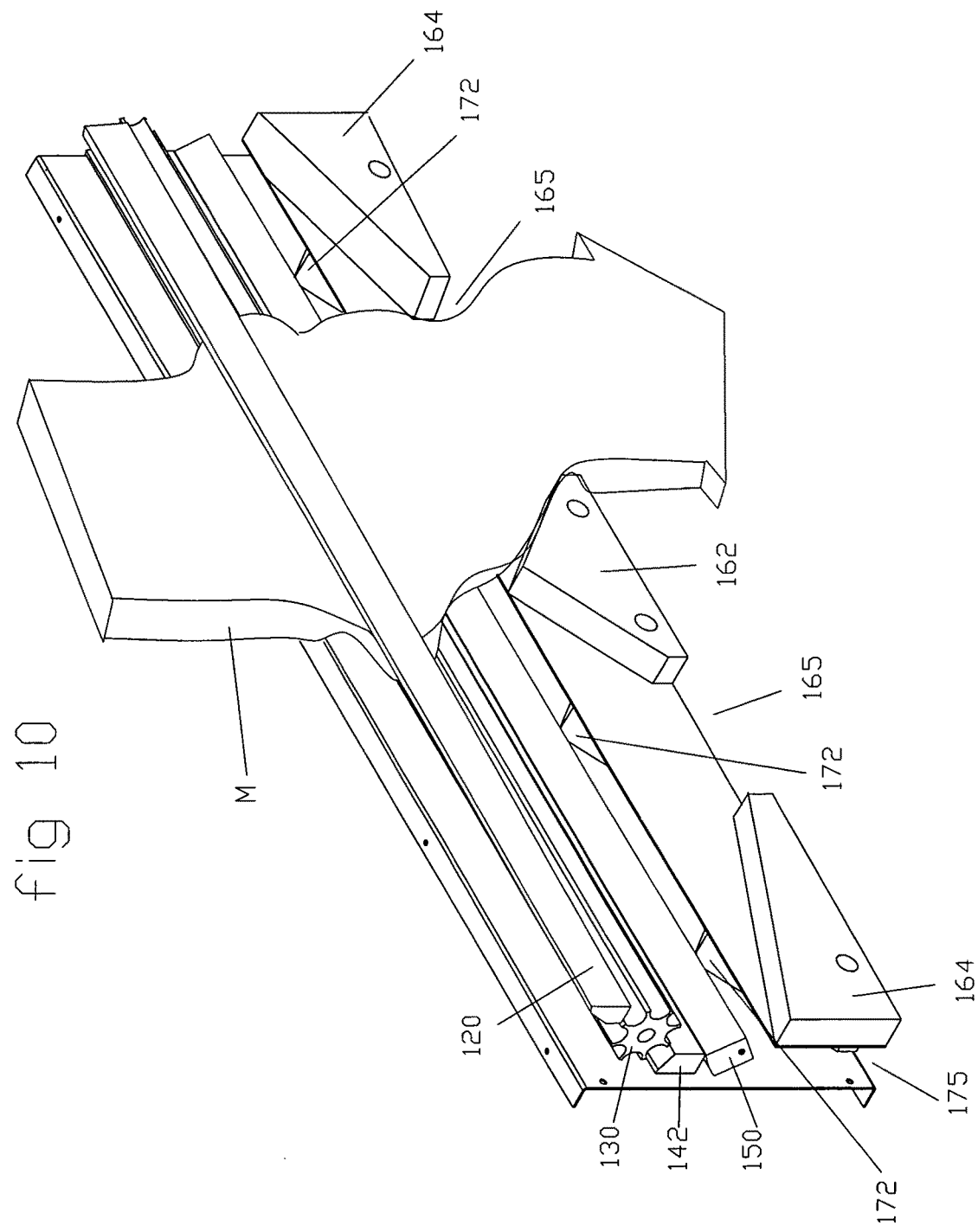
FIG. 10 is a partial, right perspective view of the right side of an embodiment comprising two dispensing openings on the right side.

With reference to FIG. 10, which is an alternate embodiment, right dispensing chute 160 comprises one spaced gable diverter 162 and two, half gable diverters 164 which collectively define two openings 165 thorough which material may pass. (From the present drawings, it will be understood the housing wall on the right side of the dispenser is not shown in FIG. 10.) The dispensing chute 160 is therefore designed to simultaneously dispense material into two cages positioned below dispensing chute 160 through dispensing openings 165. The left dispensing chute 170 comprises four spaced gable diverters 172 which collectively define three dispensing openings 175 through which material may pass. The dispensing chute 170 is designed to simultaneously dispense material into three cages positioned below dispensing chute 70 through dispensing openings 175.

The dispensing of material is initiated by the controlled rotation of impeller 30. With reference to FIGS. 6-8, impeller 30 is rotated in a clockwise direction causing material to pass between impeller 30 and the bottom of wiper 20. As discussed below with reference to a second embodiment, impeller 30 is preferably driven by a ratchet (see FIG. 11) in order to precisely control the dispensing of materials. The spacing between wiper 20 and the tips of vanes 32 of impeller 30, when the vane 32 is in its closest position to the wiper 20, is preferably approximately equal to the smallest dimension of the material. In the case of environmental enrichment products in the form of paper rolls having a length of about ⅜ of an inch and a diameter of about ⅛ of an inch, the clearance between impeller vane tips 32 and the lower surface of wiper 20 is preferably about ⅛ of an inch.

This distance can be greater or less as desired, but is preferably small enough to prevent the free flow of material through the gap between the impeller and wiper 20. Following the initial rotation of the impeller 30 one step, i.e. a predetermined number of degrees controlled by the ratchet assembly design, the material will preferably remain positioned between the bottom of a channel 34 of impeller 30 and the right housing wall 17 (also referred to the rear housing wall) of the dispenser housing until impeller 30 is rotated further. As the impeller 30 is rotated further, the material will fall down into the gap defined between right lower rail 40 and left lower rail 42.

Prior to rotation of impeller 30, the inherent properties of the materials may cause the materials to clump together near the portion of the storage chute 15 above impeller 30. As impeller 30 moves material through the gap defined between impeller 30 and wiper 20, the impeller 30 preferably acts as a fluidizer taking the material from a compact state where is has a higher density to a relatively lower density state where individual pieces of the material are free to move under their own weight and will not be subject to bridging by other pieces of the material. The rate at which material will pass through the gap between impeller 30 and wiper 20 can be adjusted by changing the depth of the channels 34 in the impeller 30 and/or by adjusting the rotational speed of impeller 30.

The wiper 20, rails 40, 42 and material directing gate 50 can be formed of inexpensive materials such as high density polyethylene, Delran® or stainless steel. It is not necessary that the seal between material directing gate 50 and the lower surfaces of the rails 40, 42 be perfectly airtight. Some minimal amount of air leakage will not impede the vacuum induced drawing of materials into the top of the dispenser chute 15 if the resulting air velocity at the intake conduit 10 is sufficient to produce lift of the environmental enrichment/bedding materials.

According to another embodiment, a sealing gate 80 is provided at the bottom of the dispenser, below the dispensing openings to provide an airtight seal to facilitate the initial loading of material.

FIGS. 4 and 5 illustrate an embodiment wherein two wipers 20 are provided, wherein one wiper is positioned above and to the right of impeller 30 and the other wiper is positioned above and to the left of impeller 30. The second wiper stops the material from falling behind the impeller.

Figure 11:
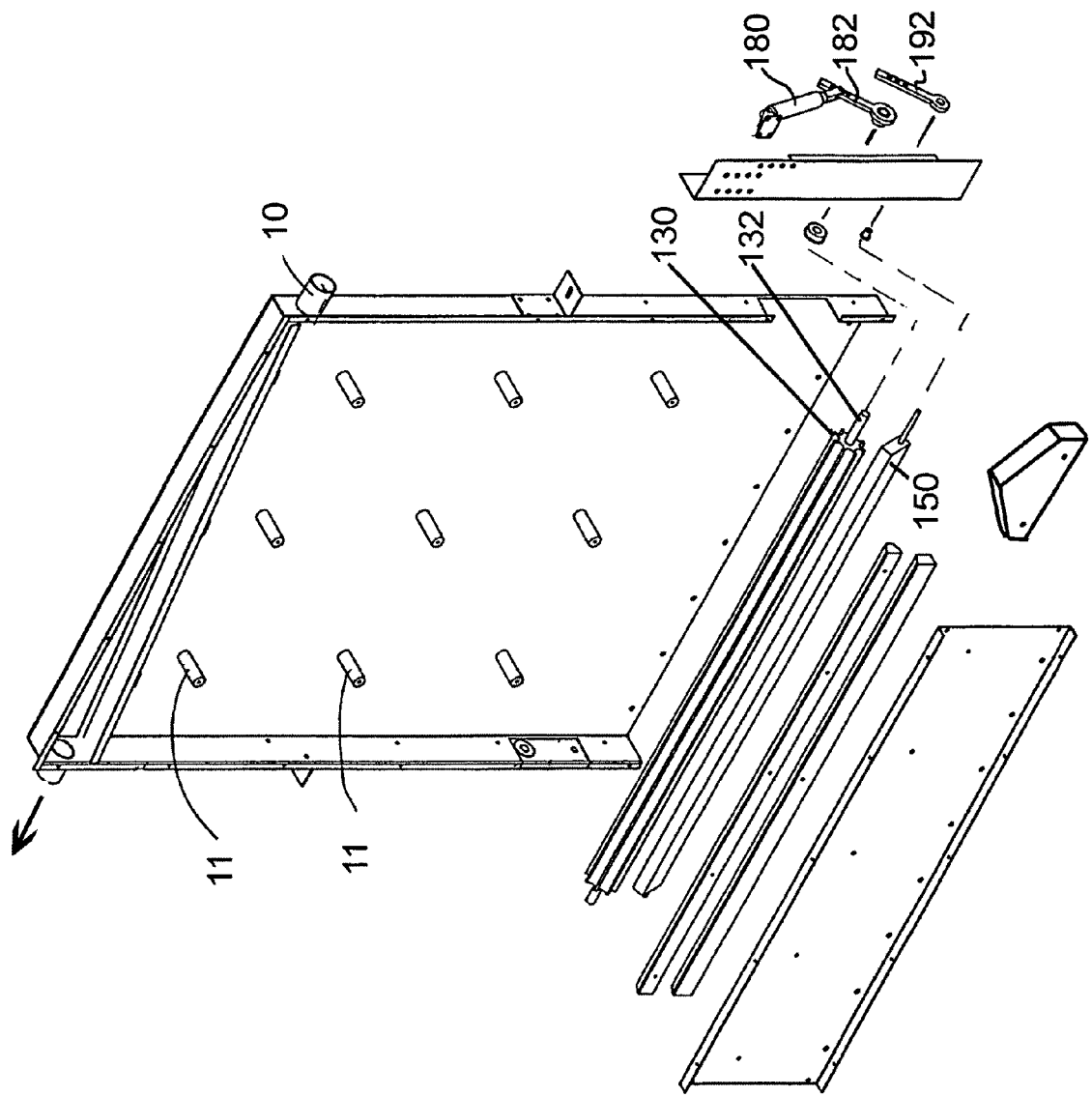
FIG. 11 is a partial, left perspective view of an alternative embodiment of the present invention.
Figure 22A:
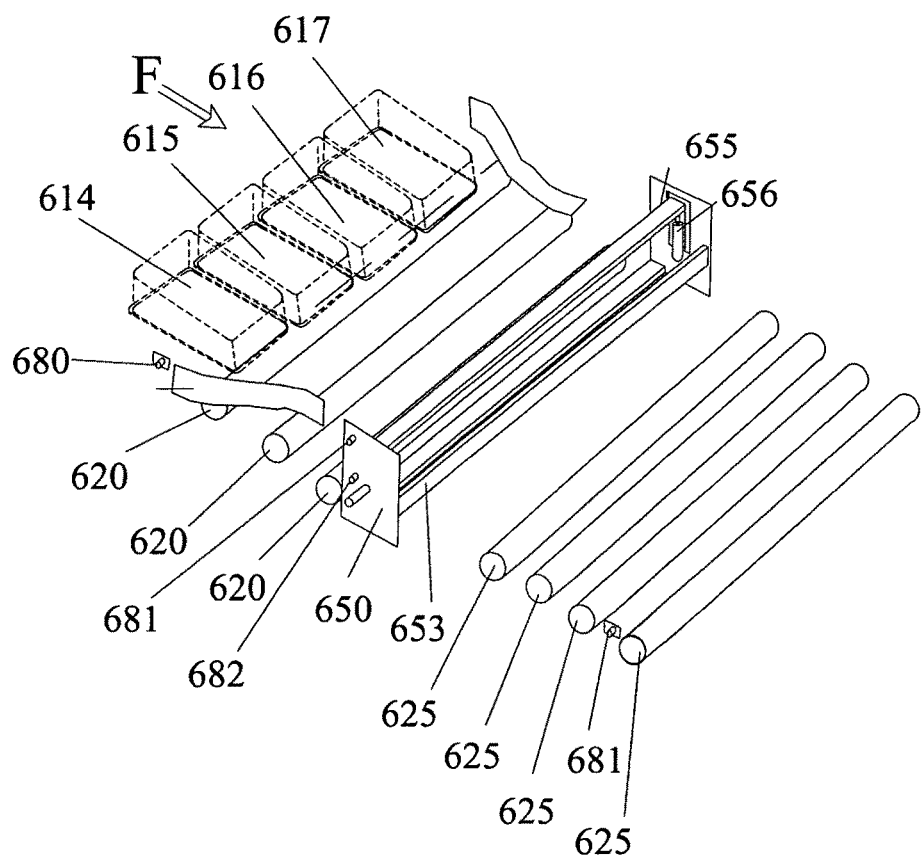
FIG. 22A is a partial perspective view showing cage detection and cage movement through the dispenser

FIG. 11 illustrates a slightly different embodiment of the present invention wherein the outlet conduit 12 is located on a side of the storage chute opposite the intake conduit 10. As shown in FIG. 11, the interior of this storage chute is provided with a plurality of pegs 11 which are provided to break up clumps of material as the material falls down in the storage chute 15 and which thereby decrease the likelihood of undesirable bridging of the material. FIGS. 11 and 12A and 12B also illustrate the use of ratchet controls for the impeller 130 and a lever coupling for the material directing gate 150. Pneumatic (or electromechanical) actuator 180 which is preferably computer controlled is connected via a ratchet, not shown, within the lever coupling 182 to the axle 132 of impeller 130. Another lever coupling 192 is connected to material directing gate 150 in order to move material directing gate 150 to the desired position at the desired time. Controls for the lever coupling 182 of impeller 130 are illustrated in FIG. 22E. Upon activation of a trigger, the programmable controller sends a signal to the actuator. The actuator can be a step motor, an air cylinder or a linear actuator. Controls for the lever coupling of the material directing gate 150 are illustrated in FIG. 22E.

Figure 22B:
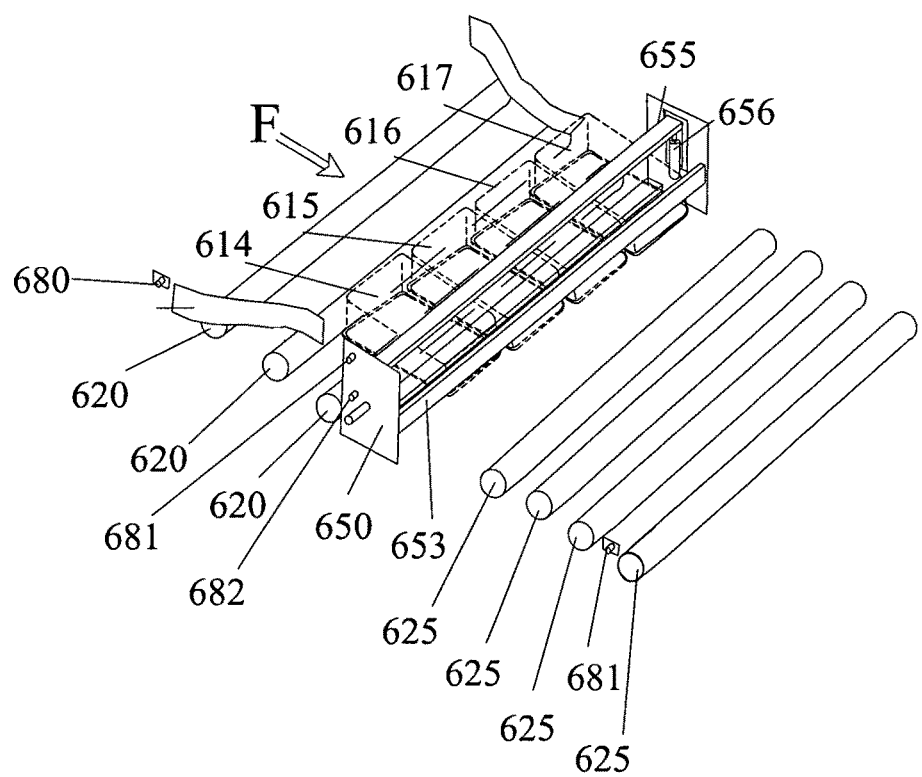
FIG. 22B is a partial is another perspective showing further cage detection and cage movement through the dispenser

The movement of material directing gate 150 is preferably linked to one or more sensors which detect the number of cages in the dispensing area below the dispensing chutes as illustrated in FIGS. 22B and 22C. For example, a sensor can readily determine the height of the cages in the dispense area and this height measurement can be used as an indication of the number of cages in the area since typically taller cages will have larger lengths and widths. In this manner, the control input which controls whether material directing gate 150 is moved to the right or the left to allow dispensing through different dispensing chutes can be automated.

At least one sensor is also provided for the storage chute 15 to sense the amount of material in the storage chute 15. As illustrated in FIGS. 2 and 3, a high sensor 21 and a low sensor 22 are provided on the storage chute 15 to identify the material amounts in the storage chute 15.

According to another embodiment of the present invention (not illustrated), instead of a single impeller, a pair of opposing impellers are utilized. The impellers can be positioned so that their vanes either overlap or do not overlap. This embodiment would also include wipers to keep material from falling back between wall and impeller.

Dispensing occurs upon activation of a trigger which includes activation of a foot pedal by a user or use of the touch panel controller 5.

Figure 13:
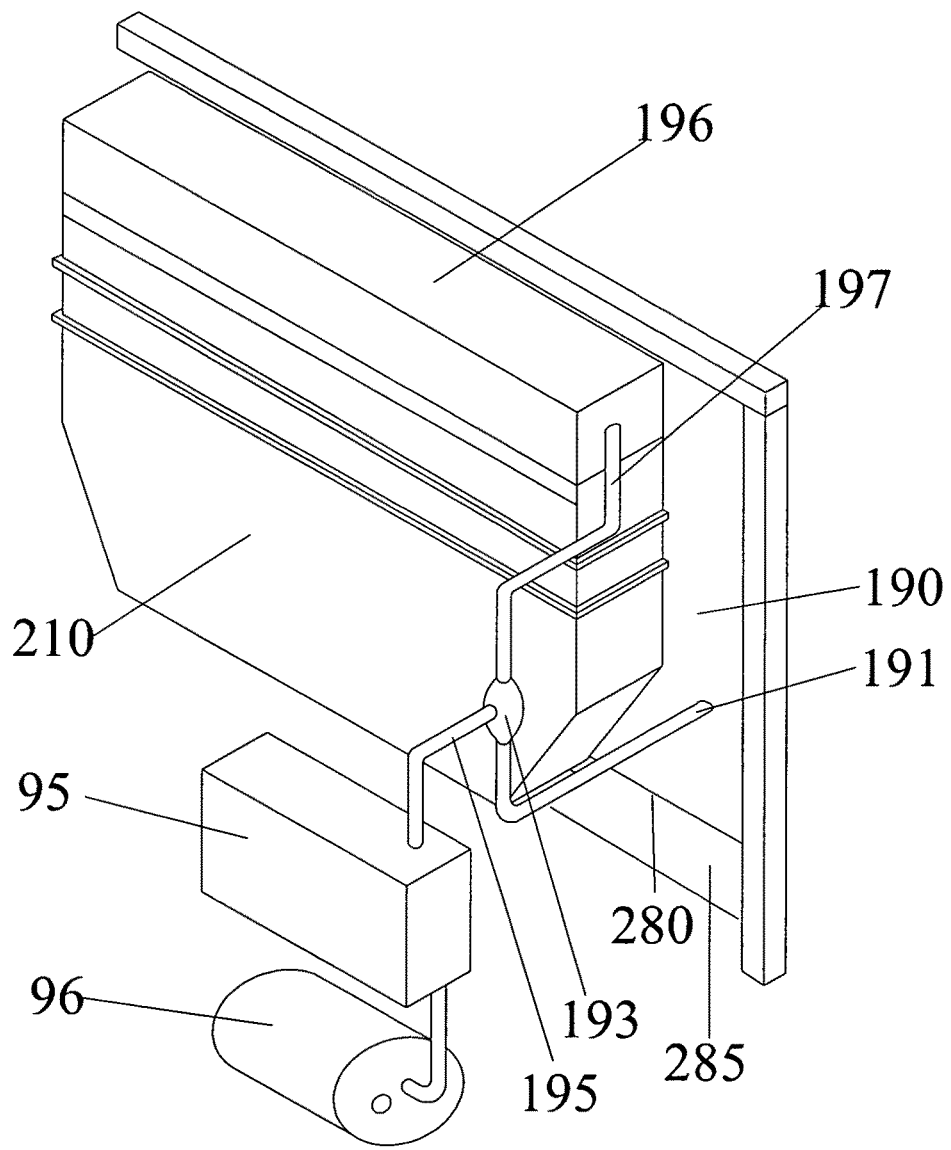
FIG. 13 is a partial, perspective view of one embodiment of a dust collection system of the present invention.

According to one illustrated embodiment of the dust collection system of the present invention shown in FIG. 13, a dust collection plenum 190 comprises dust intake vents 280 positioned proximate the dispensing openings 175 at the bottom of the dispensing chute 210. The dust collecting plenum 190 is in communication with the vacuum blower 96. The dust collection plenum 190 also has one or more dust intake vents 280 positioned in or proximate the dispensing area. The dust collection plenum 190 utilizes the vacuum created by the vacuum blower 96 to draw dust (which tends to become airborne during the dispensing of material) into the dust collection plenum 190 and away from the dispensing area.

Dust is drawn away from the dispensing area via a dust collection conduit 191, passes through a direction valve 193, through a filter cabinet conduit 195 and into a filter cabinet 95 which preferably comprises removable filters.

Figure 22:
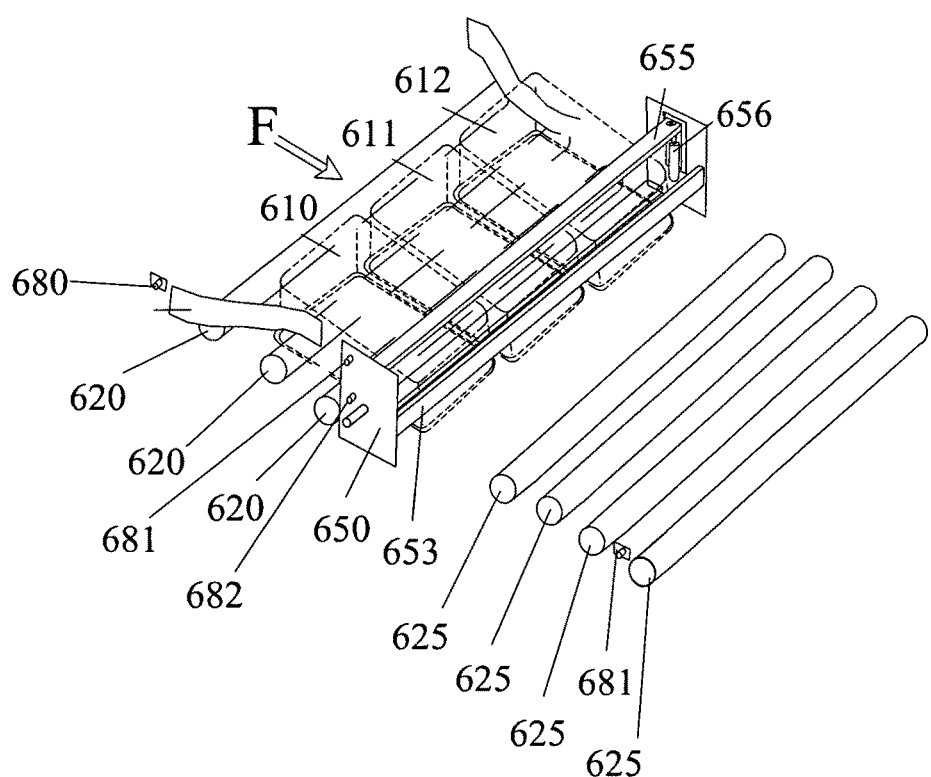
FIG. 22C is a partial perspective showing cage detection with different size cages and cage movement through the dispenser
FIG. 22D is a partial perspective showing cage movement further through the dispenser
FIG. 22E is a partial perspective showing cage movement further through the dispenser in relation to the chutes formed by the gabled diverters
Figure 22:
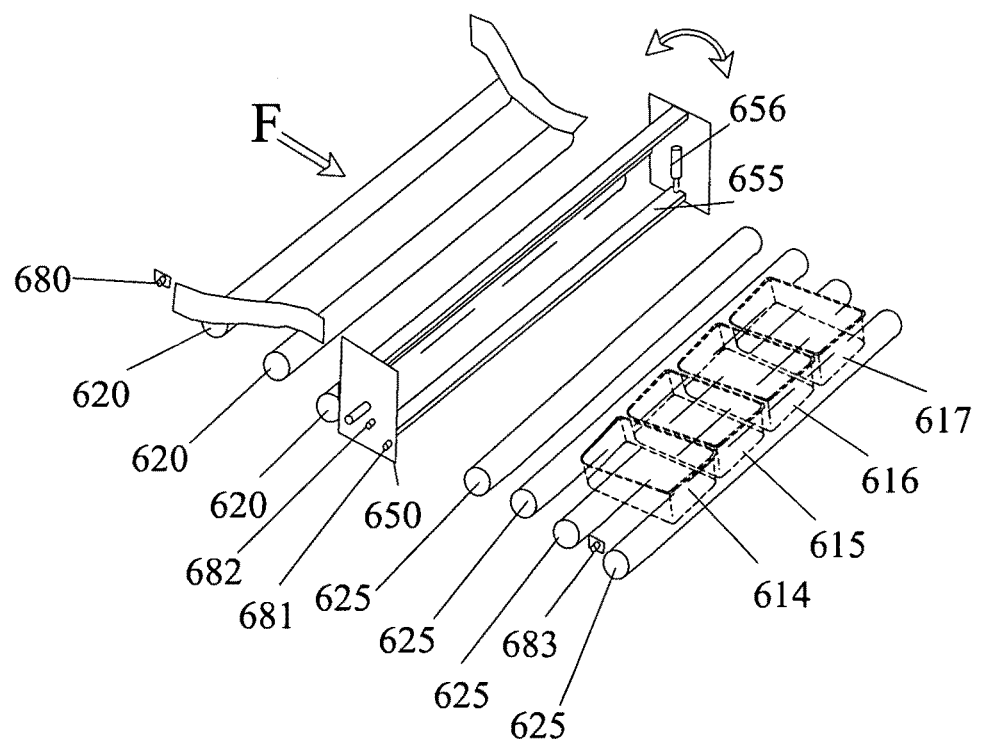
Figure 22:
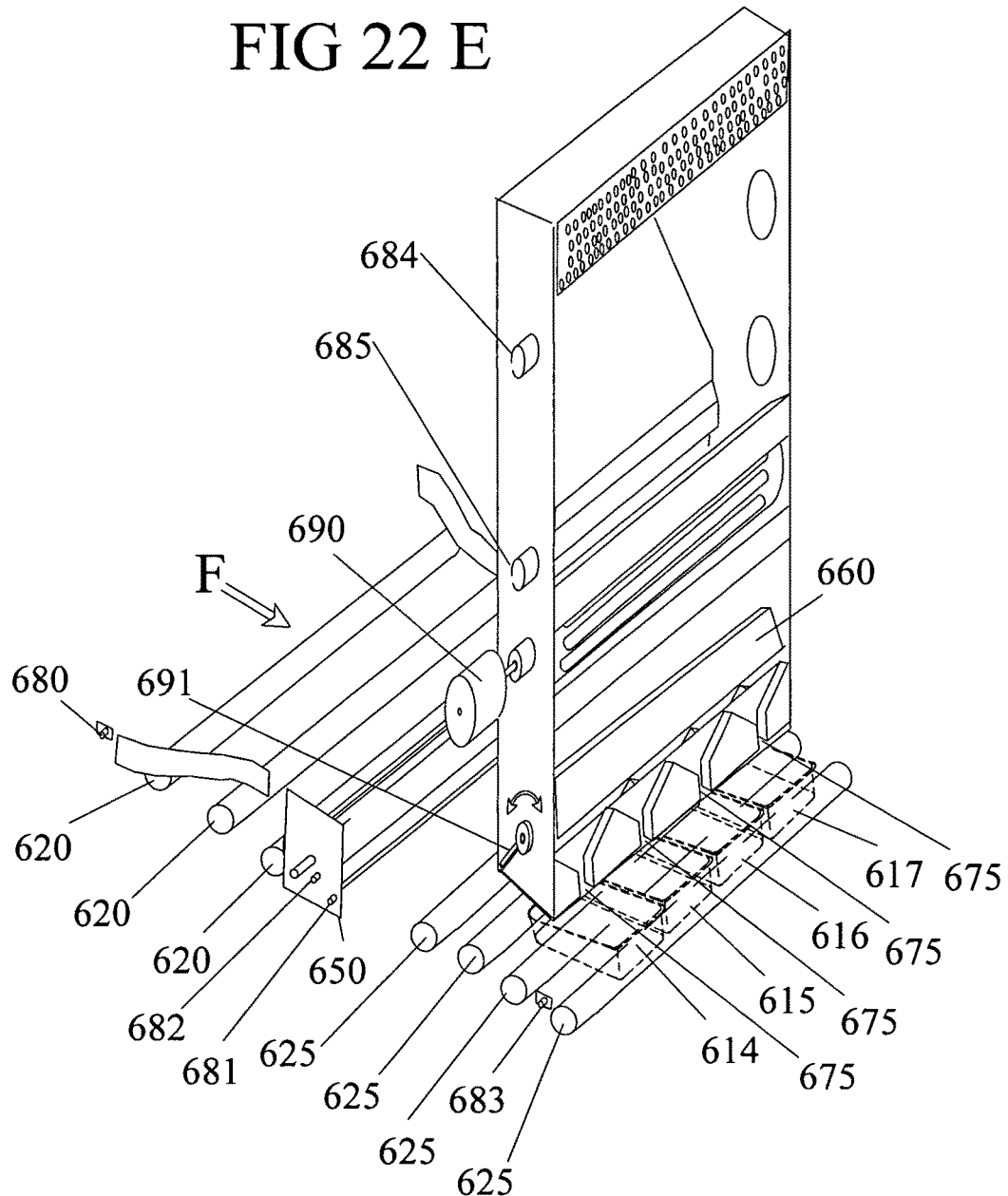

The control and timing of the dust collection can be regulated as desired by controls as illustrated in FIG. 22.

For example, the vacuum can be continuously supplied to the dust collection plenum 190 until the vacuum air is required for the movement of materials into the storage chute 196. In this instance, the vacuum in the filter cabinet conduit 195, which is used for collecting dust in the dust conduit 191, is redirected by the directional valve 193 to draw air through the storage chute outlet conduit 197. Thus, materials are drawn into the top of a storage chute 196 when the material directing gate is in the closed position. Alternatively, the vacuum can be supplied to the dust collection plenum only during and/or immediately after the dispensing of materials from the dispensing chute into the cages, or at other times as desired.

According to an alternative embodiment of the present invention, instead of, or in addition to, a dust collection plenum, one or more dust collection vents are positioned in the dispensing area. For example, the dust collection vents can be positioned between the dispensing openings which dispense materials into the cages. The dust collection vents are preferably connected to the same ducts which lead to the filters and then the vacuum blower.

Figure 14:
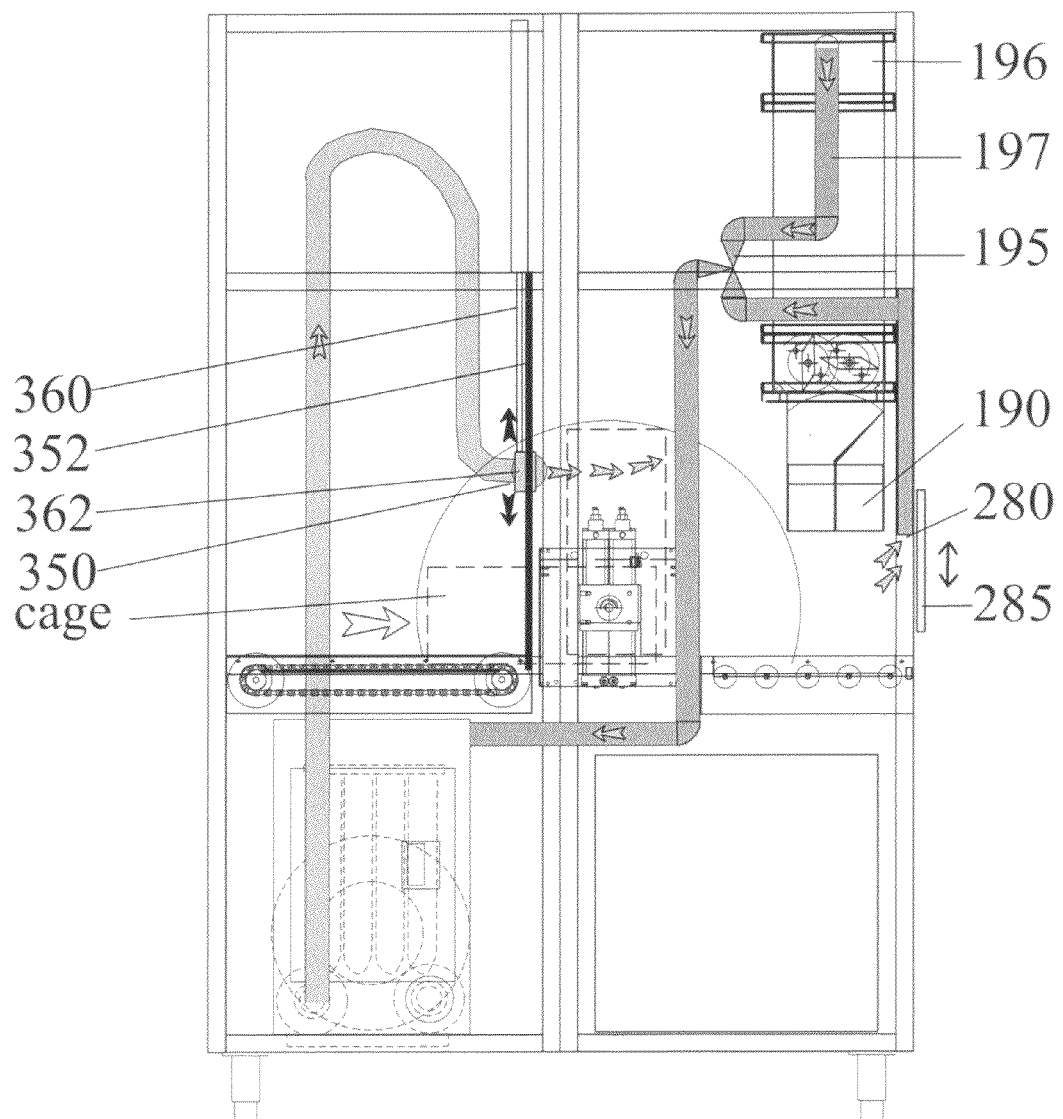
FIG. 14 is a partial side view of the dust collection system of FIG. 13.

While the filter cabinet 95 and vacuum blower 96 shown in FIG. 13 are illustrated as being positioned close to the bottom of the dispensing chute, the filtering system and vacuum blower are preferably positioned so as not to interfere with the flow of cages under the dispensing chute 210. In one preferred embodiment of the present invention, cages are moved under the dispensing chute to receive materials and then continue out the opposite side. According to other embodiments, the cages can be advanced under the dispensing chute where they receive materials, and then backed out the same direction in which they entered. FIG. 14 is a partial cross sectional view of the integrated dust collector system shown in FIG. 13. This embodiment of the present invention advantageously provides an integrated dust collector system for an animal cage refilling apparatus which includes a vacuum system for transferring bedding from a main hopper or storage bin to a storage chute. The storage chute includes a plurality of dispensing openings 275 that dispense fill material into a plurality of cages simultaneously. A number of dust intake vents 280 are positioned between the dispensing openings 275. When the vacuum is not needed to draw clean fill into the vacuum receiver, the vacuum is diverted to draw dust away from the dispensing (fill) area. The dusty air is preferably passed through a filtering system, e.g. pocket filters, which are easily cleanable and are built-in as part of the same system. Alternatively, or in addition to the vents positioned near the dispensing chutes, vents or a dust collection plenum can be positioned elsewhere either within, proximate to or outside of the material dispensing area.

Figure 15:
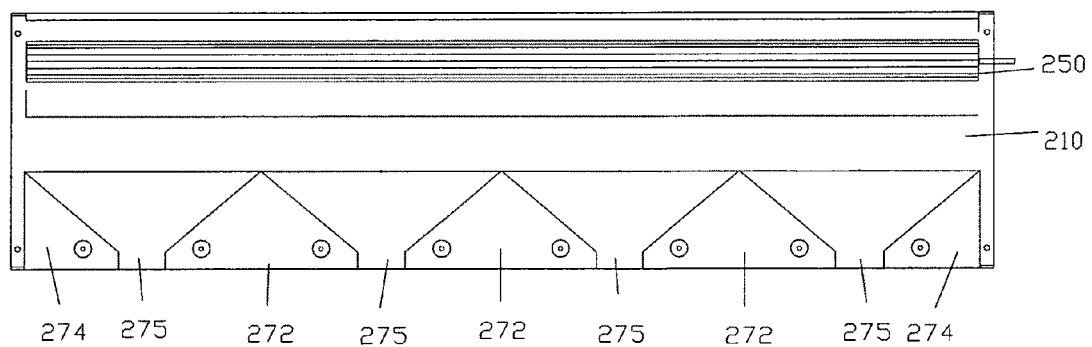
FIG. 15 is a portion of an alternative embodiment of the present invention which is a sectional view of a dispensing chute.

FIG. 15 illustrates a portion of an alternative embodiment of the present invention which is a sectional view of a dispensing chute 210 comprising a rotatable impeller 250 and which dispenses materials through dispensing openings 275 which are separated by hollow gables/half gables 272/274. In this embodiment, the duct work for dust intake vents 280 to the vacuum blower is attached to the front bottom portion of the dispenser near gables 272 which are hollow. The duct work is not shown in this figure.

Figure 16:
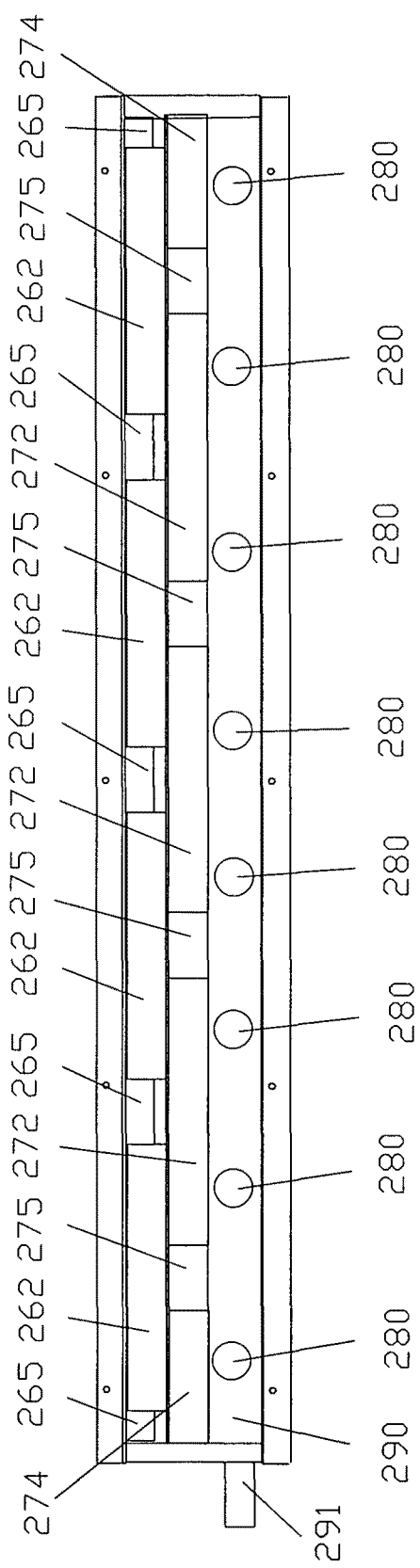
FIG. 16 is a bottom view showing the dispensing openings and dust collection vents.
Figure 17:
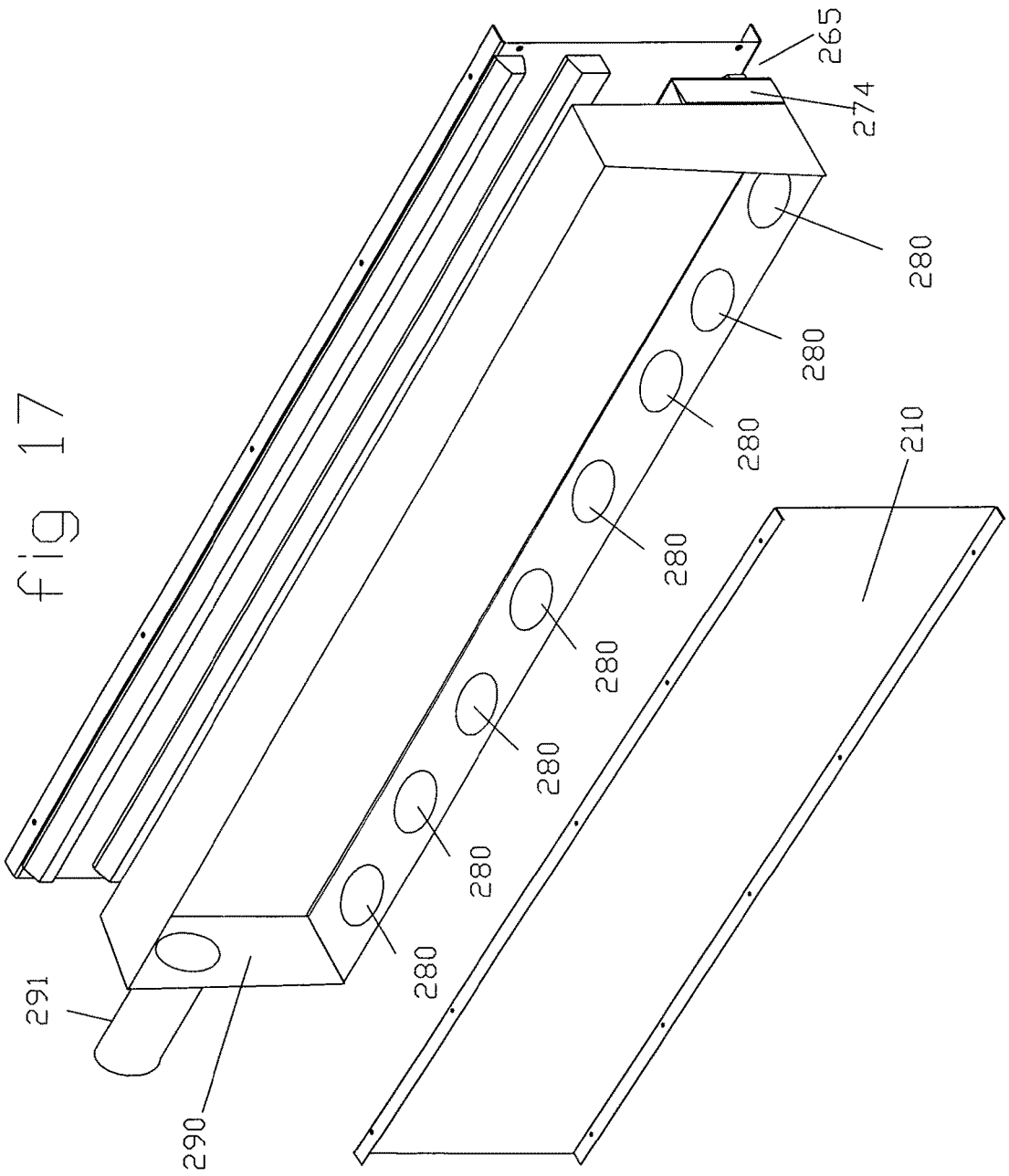
FIG. 17 is a partial exploded, top perspective view of the embodiment of FIG. 16.

FIGS. 16 and 17 illustrate an alternative embodiment wherein FIG. 16 is a bottom view showing the dispensing openings 275, dispensing openings 265, and dust intake vents 280. Gable diverters 262 define dispensing openings 265 and gable diverters 272 and half gable diverters 274 define dispensing openings 275.

FIG. 17 is a partial perspective view of the dust collection manifold 290 with the left wall of the dispensing chute 210 removed showing the dust intake vents 280 and the dust collection conduit 291.

Figure 18:
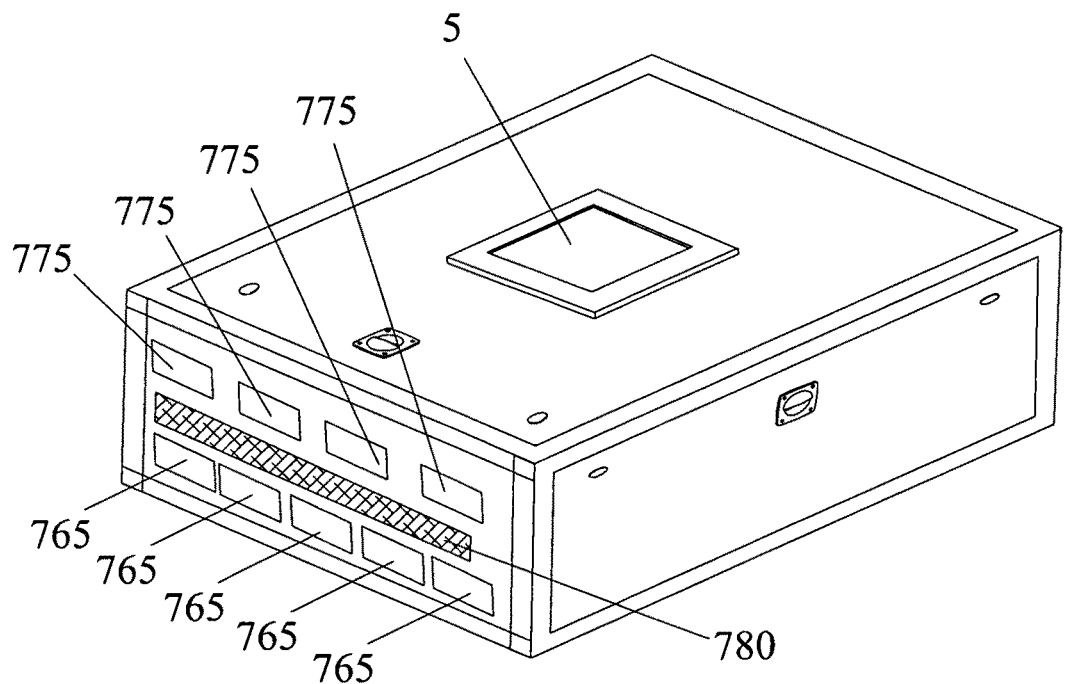
FIG. 18 is a bottom perspective view of another embodiment illustrating dust collection vents between two sets of dispensing chutes.

FIG. 18 is a partial, bottom perspective view of a dispenser unit of an alternative embodiment of the dust collection unit of the present invention which positions the dust intake vents 780 between the dispensing openings 765, 775.

According to another embodiment, the dust collection system may include an additional gate which acts a dust shield.

With reference to FIGS. 13 and 14, when sensors indicate that the cages are in the dispensing area beneath the dispensing openings, the gate 285 is activated to come down and seal the internal area of the dispensing unit. The gate 285 is in a closed position when material is being dispensed into the cages and dust collection is occurring. Once the cages are filled and dust collection has been performed, the gate 285 returns to an open position and allows the cages to exit the device.

Another aspect of the present invention relates to a programmable controller which advantageously facilitates the programming of automated control of the dispensing system. The controller can advantageously be programmed to control the dispensing of different materials, the dispensing output quantities, and/or the dispensing openings used for different numbers and/or sizes of cages. The controller also controls dispensing of different materials from different supply sources.

The programmable controller and the touch panel Human Machine Interface record which different materials have been dispensed, the number and/or sizes of cages to which material has been dispensed, and provide internal alarms, user identification, and other data within the system, all of which is preferably time/date stamped. The controller is preferably connectable to the internet to allow diagnostics and other remote monitoring, for example, the monitoring of the extent of usage, by authorized entities at remote locations. For example, authorized entities can also monitor the frequency with which filters are changed, the quantities of cages filled with specific materials, the volumetric totals dispensed, and/or the number of times the unit has dispensed any materials and/or certain materials.

The programmable controller and the touch panel Human Machine Interface is programmed to alert an operator regarding the need to check the filter. Programming is also provided which controls filling of the storage chute, including an auto-fill feature for the storage chute when the material levels fall below a predetermined, sensor-detected level. The auto-fill feature can be overridden by a user.

The set up, operation and maintenance of the dispensing unit through the controller is user specific and provided with security access.

Additionally, the accumulative data is stored in a memory device at preset intervals and is accessible via the internet or removable memory drive such as a memory stick thumb drive.

Another aspect of the present invention is directed to a system for aligning, indexing and drying laboratory animal cages which have already been cleaned in a cleaning station. These cages are properly aligned and dried prior to the dispensing of bedding and/or other materials used with laboratory animals into the cages.

According to one embodiment of the present invention, an alignment and indexing device is provided having a plurality of powered rollers which advance the cages. As the cages are advanced, the cages are aligned in two different directions. A vertically movable stop gate is positioned in front of the advancing cages to stop the cages thereby aligning the cages front to back. Pneumatic cylinders on the right and/or left of the cages are actuated to align the cages laterally, i.e. side-to-side. The pneumatic cylinders can be actuated simultaneously or subsequent to the positioning of the stop gate.

According to a preferred embodiment, after the cages are properly aligned, the stop gate is retracted and the cages are advanced to a rotary clamp. The rotary clamp, also referred to herein as an "inverter", grips the cages, flips the cages over, and puts the cages on a belt which advances the cages to a filling station right-side-up. It is usually necessary to invert the cages prior to dispensing since cages usually exit an automated cage cleaner in an upside-down position to facilitate drainage.

According to another embodiment, alignment and indexing is achieved laterally by guides placed on either side of a plurality of powered rollers which advance the cages into the inverter. As the cages are advanced into the back of the inverter which thereby stops the forward motion of the cages, the cages are aligned front to back.

A preferred embodiment of the present invention also dries the laboratory animal cages, during indexing and alignment and/or subsequent to indexing and alignment. Exhaust air from a vacuum blower, which is usually somewhat heated by the compressor in the vacuum blower, is preferably used to remove any water remaining in and/or on the cages from the cleaning station. This device directs the air that is exhausted from the vacuum blower onto the cages. This aspect of the invention efficiently puts the heated air from the vacuum blower, which would otherwise go to waste, to good use.

According to another embodiment, a heater is provided to provide supplemental heating to the exhaust air from the vacuum blower or to drying air provided by another source. The hot, high pressure air is directed at the cages when they are upside down prior to being grabbed by the rotary clamp. Alternatively and/or additionally, the hot air is directed at the cages when the cages are inclined as they are in the rotary clamp, e.g. when they are half way through the flip of the cages from an upside down to a right side up. The drying device preferably comprises a vertically movable linear actuator that movably supports a nozzle head having a plurality of openings for directing heated, high pressure air at the cages, starting from an upper side of each cage and moving downwardly to a lower side of each cage.

According to another embodiment (not shown), the air is exhausted from the back of the blower onto the cages as the cages are being advanced by the plurality of rollers towards the inverter.

Figure 19:
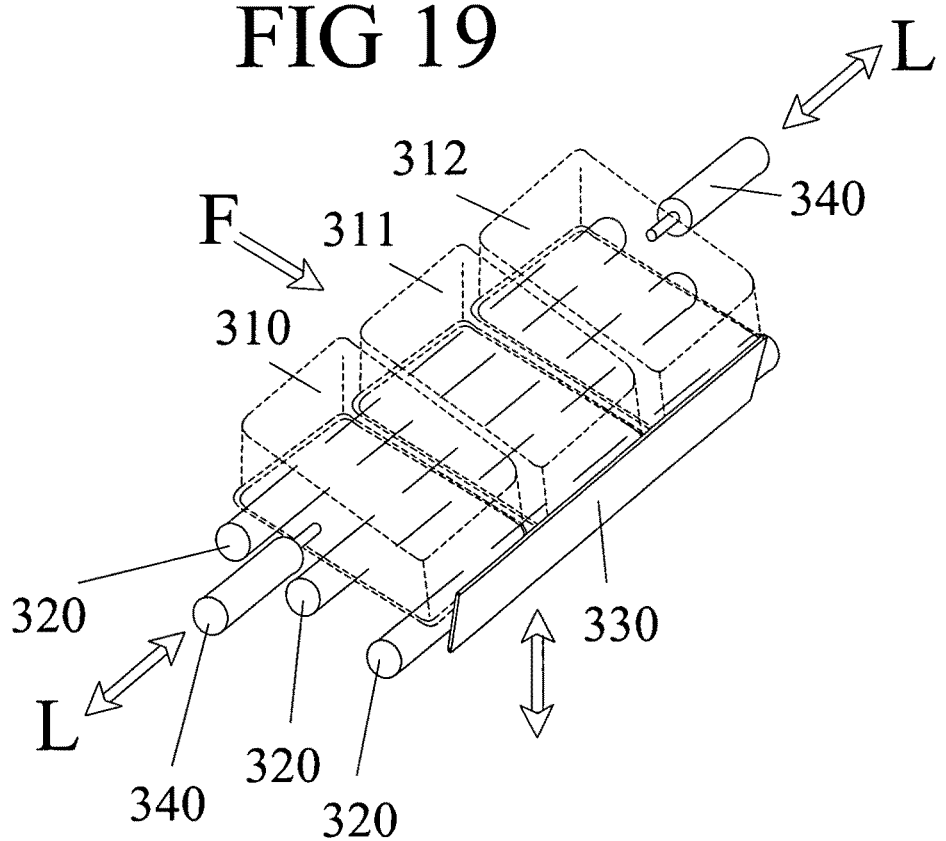
FIG. 19 is partial perspective view of one embodiment of an alignment and indexing device of the present invention.
Figure 19:
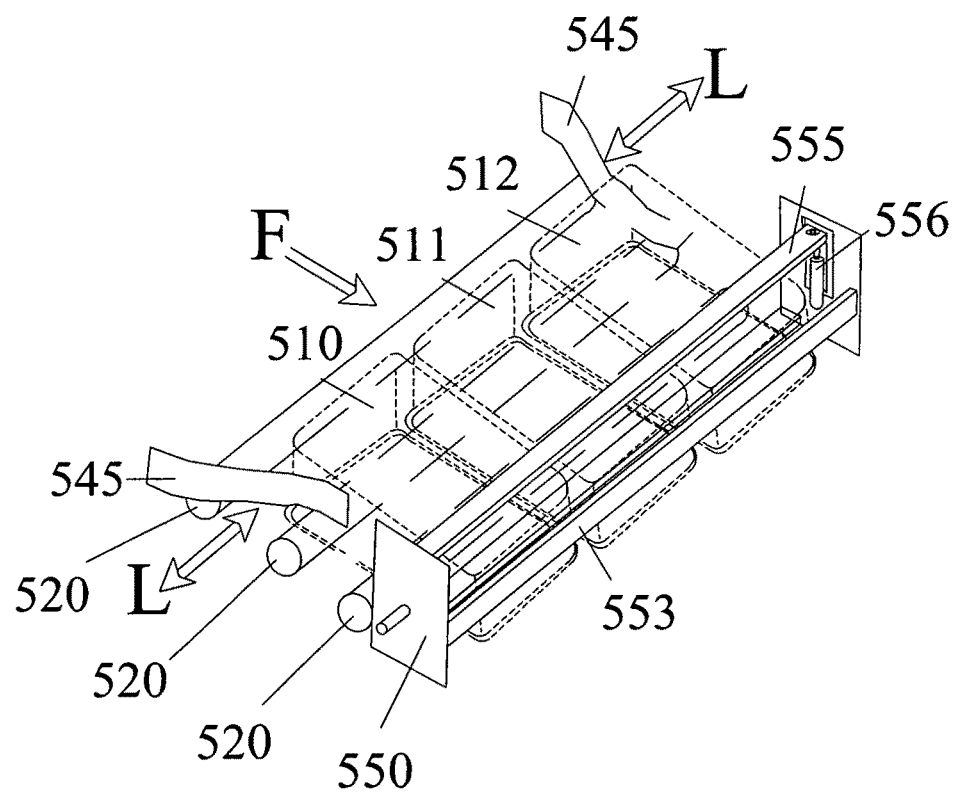

With reference to FIG. 19, three cages 310, 311, 312 are shown positioned on power rollers 320 which are caused to rotate to advance each of the cages 310-312 in the direction indicated by arrow F to a vertically movable stop gate 30. Suitable controls are provided to either raise or lower the gate 330 as needed in order to position the stop gate 330 in front of cages 310-312 thereby stopping the forward advancement of cages. This aligns cages 310, 311 and 312 in the forward direction. Pneumatic cylinders 340 are then actuated inwardly as indicated by arrows L in order to provide lateral alignment, i.e. side-to-side alignment, of the cages. After proper alignment, stop gate 330 is moved out of the path of the cages and power rollers 320 advance the cages into a rotary clamp (not shown in FIG. 19).

Alternatively, in an embodiment without the stop gate, the cages are aligned front to back by the advancement of the cages into a back bar of the rotary clamp by the power rollers, which thereby stops the forward motion of the cages and aligns the cages front to back.

With reference to FIG. 19A, according to another embodiment, three cages 510, 511, 512 are shown positioned on power rollers 520 which are caused to rotate to advance each of the cages 510-512 in the direction indicated by arrow F to a back bar 553 of the rotary clamp 550, thereby stopping the forward advancement of cages. This aligns cages 510, 511 and 512 in the forward direction. Guides 545 are provided to induce cages 510-512 inwardly as indicated by arrows L in order to provide lateral alignment, i.e. side-to-side alignment, of the cages. Guides 545 are preferably plastic guides. Once cages 510-512 advance to the back bar 553, a clamping bar 555 of rotary clamp 550, which is actuated by a linear actuator 556 engages the bottoms of cages 510-512 prior to inverting the cages to right-side-up.

Figure 20:
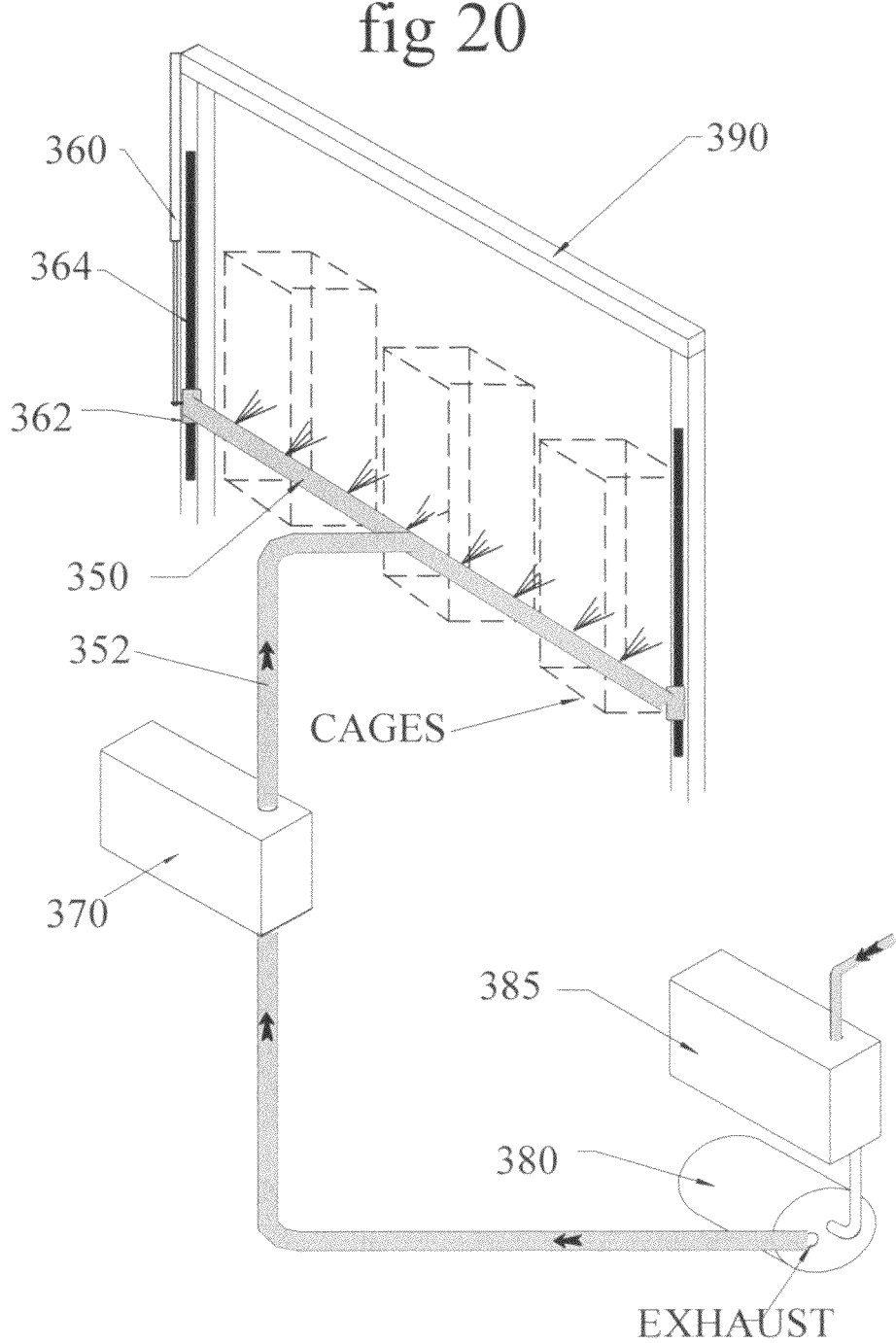
FIG. 20 is a partial perspective view of one embodiment of a dryer of the present invention.

FIG. 20 illustrates a dryer of one embodiment of the present invention. As mentioned above, after the cages have been indexed and aligned, they are advanced into a rotary clamp which rotates the cages from the inverted position shown in FIG. 19 to an upright position. FIG. 20 illustrates the cages after having been rotated only 90 degrees by the rotary clamp which is not shown in this Figure. The figures are for illustration purposes only and are not intended to be limiting. It will be appreciated that the three cages illustrated may be touching each other after alignment and during rotation in the rotary clamp.

As indicated in FIG. 20, in this embodiment exhaust air from a vacuum blower is fed through a heat exchanger 370 to optionally further heat the exhaust air. The heated air is then directed onto the cages using a nozzle 350 which is moved vertically relative to the cages and blows air into and onto the cages. In FIG. 20, the open portion of the cages faces the movable nozzle 350. Thus, the cages are inverted approximately 90 degrees, or less e.g. about 70 degrees. Linear actuator 360 moves a glide block 362 on the illustrated glide rail 364 in order to move nozzle 350 across the cages. Nozzle 350 preferably moves from an upper position to a lower position, at least once and, optionally, several times in order to provide effective drying of the interior of the cages. Suitable hoses and/or connectors 352 are provided to allow nozzle 350 to move relative to the heat exchanger 370.

Figure 21:
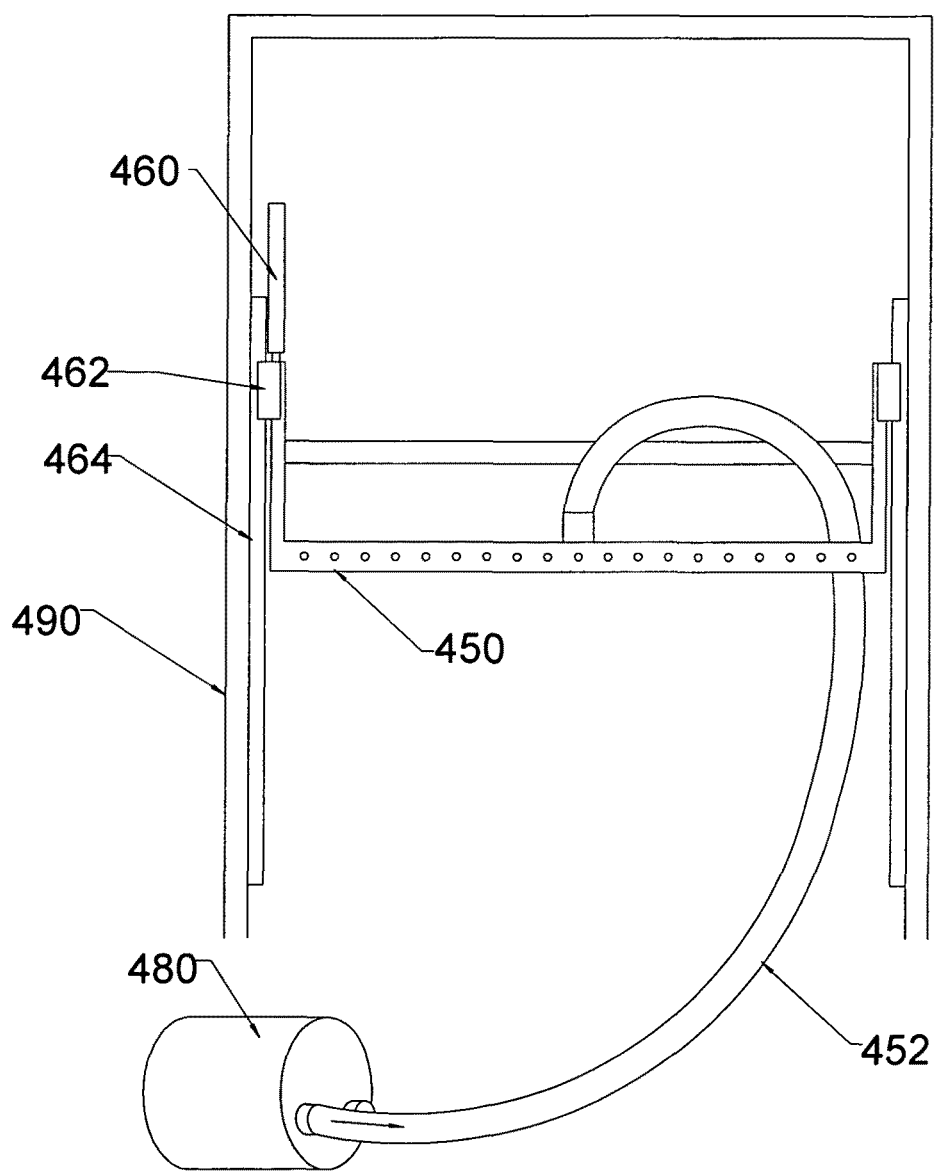
FIG. 21 is a partial perspective view of an alternate embodiment of a dryer of the present invention.

FIG. 21 illustrates an alternative embodiment of the present invention which does not include a heat exchanger. In this embodiment, exhaust air from a blower 480 is connected to nozzle 450 with a flexible hose 452. In this embodiment, there is no supplemental heating supplied to the air by a heat exchanger as in the embodiment shown in FIG. 20. Linear actuator 460 moves a glide block 462 on the illustrated glide rail 464 in order to move nozzle 450 across the cages.

While it is presently deemed preferable to blow drying air across the cages while they are partially inverted, e.g., at angles of about 45 degrees, 60 degrees, 70 degrees or 90 degrees, it is also within the scope of the present invention to use the exhaust drying air to dry the cages when they are totally inverted as shown in FIG. 19 or after they have been rotated to a right-side-up configuration.

With reference to FIGS. 22A, 22B, 22C, 22D and 22E, four cages 614,615,616 and 617 are shown positioned in front of detection sensor 680, which signals to the controls the presence of cages 614,615,616 and 617 which in turn powers on the power rollers 620 which are caused to rotate to advance each of the cages 614,615,616 and 617 in the direction indicated by arrow F to the back bar 653 of the rotary clamp 650, thereby stopping the forward advancement of cages. This aligns cages 614,615,616 and 617 in the forward direction.

With reference to FIG. 22B when cages 614,615,616 and 617 have reached back bar 653 of the rotary clamp 650, cage in position sensor 681 signals to the controls the presence of cages in the rotary clamp 650. With reference to FIG. 22E, the controls activate the actuator (not shown) attached to coupling 691 to set the directional gate 660 in the position to guide the materials into appropriate chutes 617 that match the number and size of cages that will be dispensed into. The controls also set the pre determined number of pulses for the impeller actuator to dispense the correct amount of materials into the cages.

With reference to FIG. 22C, when cages of a different size, in this case large cages 610, 611 and 612, have reached back bar 653 of the rotary clamp 650, both cage in position sensor 681 and large cage sensor 682 signals to the controls the presence of cages in the rotary clamp 650 and that the cages are of large size. With reference to FIG. 22E, the controls activate the actuator (not shown) attached to coupling 691 to set the directional gate 660 in the position to guide the materials into appropriate chutes opposite 617 that match the number and size of cages that will be dispensed into. The controls also set the pre determined number of pulses for the impeller actuator to dispense the correct amount of materials into the cages according to the size cages.

With reference to FIG. 22D, cages 614,615,616 and 617 are first clamped by clamp bar 655 via actuator 656 and the cages are rotated 180 to their up-righted position onto power rollers 625. The actuator is then de-energized releasing the cages and then the power rollers 625 are energized to advance the cages in front of the trigger sensor 683 and under the dispensing chutes.

With reference to FIG. 22E, when cages have moved in front of the trigger sensor 683 and under the dispensing chutes the power rollers 625 are de-energized and the impeller actuator 690 is activated for the number of pulses for the impeller actuator to dispense the correct amount of materials into the cages according to the size cages. After the cages have been dispensed into, the dust shield (not shown) is raised and power rollers 625 are energized, ejecting the cages out of the dispenser.

I claim:

1. A system for dispensing material into cages for laboratory animals, said system comprising:
   a storage chute comprising an inlet for air and material and an air outlet;
   a source of a vacuum selectively in connection with said air outlet for drawing material into said storage chute;
   a dispenser comprising a plurality of dispensing chutes selectively in communication with said storage chute, said dispensing chutes comprising openings through which material is dispensed into cages, said plurality of dispensing chutes comprising a first dispensing chute comprising a first number of openings and a second dispensing chute comprising a second number of openings which is different from said first number of openings; and
   a material directing gate for selectively directing material to at least one of said first dispensing chute or said second dispensing chutes.

2. A system for dispensing material into cages according to claim 1 wherein said material directing gate is selectively positionable in a closed position or at least one dispensing position.

3. A system for dispensing material into cages according to claim 1 wherein said material directing gate is selectively positionable in one of a plurality of dispensing positions.

4. A system for dispensing material into cages according to claim 1 wherein said material directing gate is controlled by an actuator.

5. A system for dispensing material into cages according to claim 1 wherein at least one of said dispensing chutes simultaneously dispenses material through a plurality of said openings.

6. A system for dispensing material into cages according to claim 1 wherein said dispensing chutes comprise a plurality of spaced gable diverters.

7. A system for dispensing material into cages according to claim 6 wherein said first dispensing chute comprises a first number of gable diverters and said second dispensing chute comprising a second number of gable diverters, wherein said first number of gable diverters is not equal to said second number of gable diverters.

8. A system for dispensing material into cages according to claim 1 wherein said material directing gate is selectively positionable in a closed position, a first dispensing position, and a second dispensing position, wherein when said material directing gate is in said first dispensing position, material passes through a first dispensing chute, and when said material diverting gate is in said second dispensing position, material passes through a second dispensing chute.

9. A system for dispensing material into cages according to claim 8 wherein said first dispensing chute comprises four spaced gable diverters which define five dispensing openings.

10. A system for dispensing material into cages according to claim 8 wherein said second dispensing chute comprises three spaced gables diverters and two half gable diverters which define four dispensing openings.

11. A system for dispensing material into cages according to claim 1 wherein said storage chute is defined by a front housing wall and a rear housing wall, wherein said rear housing wall is spaced from said front housing wall, and wherein said storage chute further comprises a perforated screen positioned between said front wall and said rear wall, and positioned between said inlet and said air outlet.

12. A system for dispensing material into cages according to claim 11 wherein said storage chute comprises a plurality of pegs extending from said front housing wall to said rear housing wall.

13. A system for dispensing material into cages according to claim 1 wherein said material directing gate provides an air tight seal to said dispenser.

14. A system for dispensing material into cages according to claim 1 wherein said source of a vacuum is disposed proximate said storage chute.

15. A system for dispensing material into cages according to claim 1 wherein said dispenser comprises a sealing gate disposed proximate said plurality of dispensing chutes.

16. A system for dispensing material into cages according to claim 1 wherein said dispenser comprises at least one sensor and wherein the positioning of said material directing gate is responsive to input received from said sensor.

\* \* \* \* \*